United States Patent [19]

Sojka

[11] Patent Number: 4,924,462
[45] Date of Patent: May 8, 1990

[54] MULTITERMINAL COMMUNICATION SYSTEM AND METHOD

[75] Inventor: Marvin L. Sojka, Cedar Rapids, Iowa

[73] Assignee: Norand Corporation, Cedar Rapids, Iowa

[21] Appl. No.: 292,810

[22] Filed: Jan. 3, 1989

Related U.S. Application Data

[63] Continuation-in-part of Ser. No. 265,842, Nov. 1, 1988.

[51] Int. Cl.$^5$ .............................................. H04J 3/16
[52] U.S. Cl. ................................ 370/95.2; 340/825.08
[58] Field of Search .................... 370/96, 90, 95, 89, 370/94; 340/825.08, 825.5, 825.51

[56] References Cited

U.S. PATENT DOCUMENTS

| | | | |
|---|---|---|---|
| 4,744,077 | 5/1988 | Fadem et al. | 370/96 |
| 4,809,268 | 2/1989 | Tejima et al. | 370/96 |

Primary Examiner—Douglas W. Olms
Attorney, Agent, or Firm—Neuman, Williams, Anderson & Olson

[57] ABSTRACT

In an exemplary communications system a multiplicity of mobile terminals are to share a communications link with a primary processor. The primary processor may transmit a multiterminal polling signal defining a series of successive response time slots which the terminals may randomly select. A terminal wishing to send a message transmits a brief response burst in the selected time slot giving its identification. The primary processor may then sequentially poll specific individual terminals having messages to send. The primary processor may maintain a record of currently active terminals and/or of collisions (where more than one terminal seeks to transmit in the same response time slot), and as needed may automatically send e.g. with its multiterminal poll, a time slot number change, creating a greater or lesser number of time slots for future use by the active terminals. The system is thus highly adaptable on a dynamic basis during operation so as to readily maintain optimum throughput under changing conditions. As a consequence additional terminals may become active simply by transmitting their respective identifications in randomly selected response time slots. The multiterminal poll may include a listing of one or more terminals for which the primary processor has a message so that the primary processor may be assured that such terminal is available (as indicated by its response in a random time slot) before a lengthy message is sent.

10 Claims, 4 Drawing Sheets

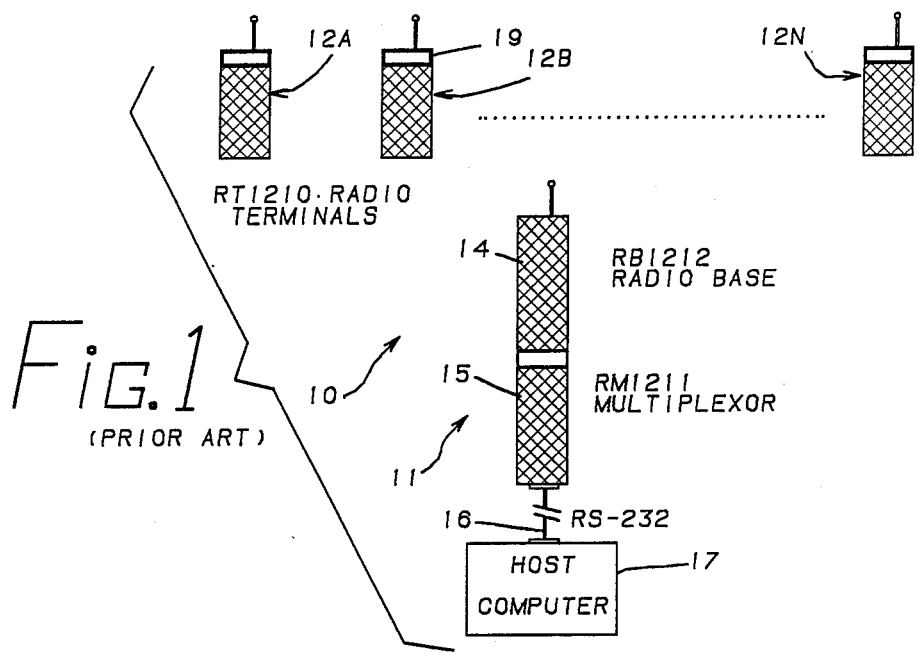
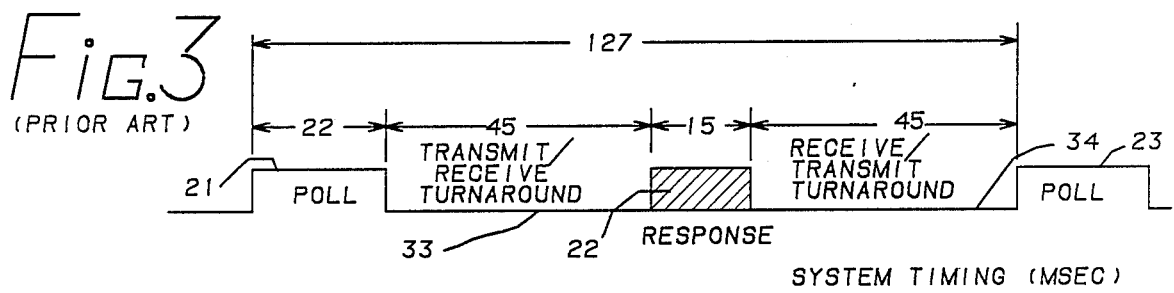
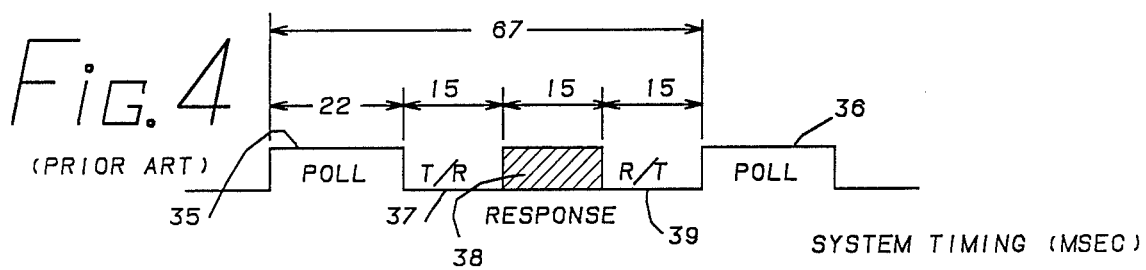

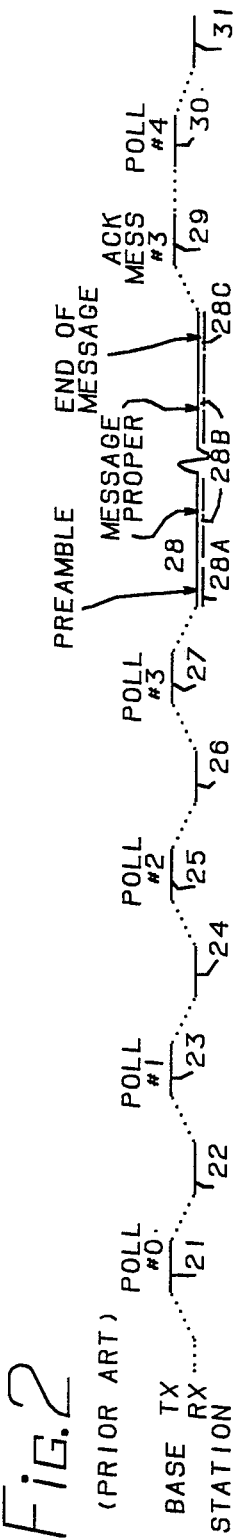
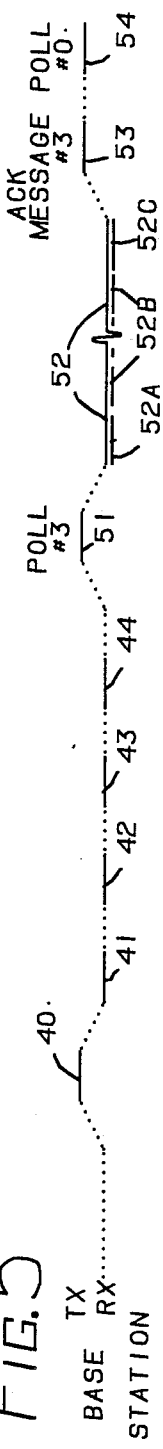

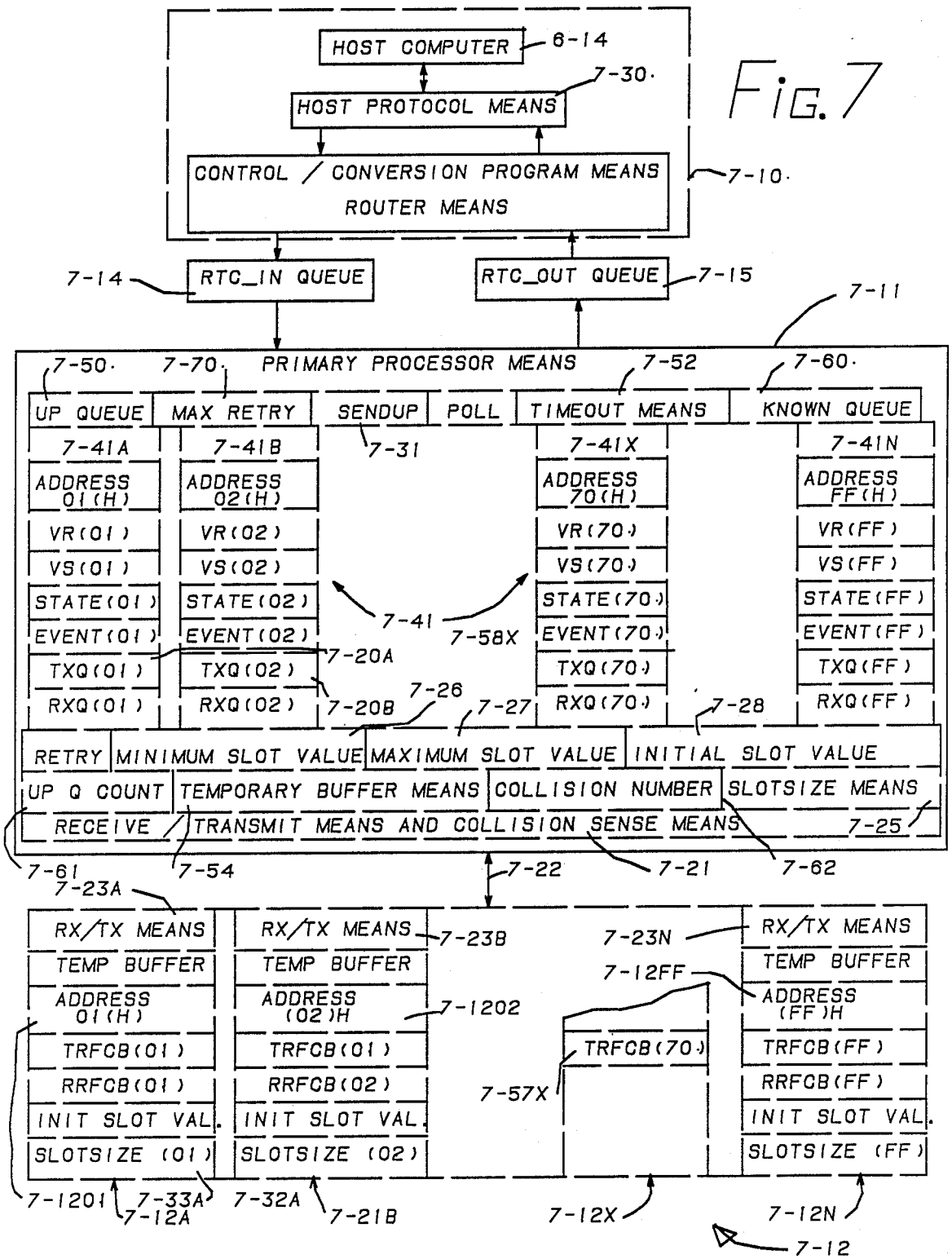

MULTITERMINAL COMMUNICATION SYSTEM AND METHOD

CROSS-REFERENCE TO RELATED APPLICATIONS

This application is a continuation in part of my copending application of the same title, U.S. Ser. No. 265,842 filed Nov. 1, 1988, and the entire disclosure of the copending application including APPENDIX A and the drawings thereof is hereby incorporated herein by reference.

A commonly assigned application for Patent of Ronald L. Mahany entitled "Mobile Radio Data Communication System and Method" U.S. Ser. No. 228,355 filed Aug. 4, 1988, including the entire disclosure and drawings, is also hereby incorporated herein by reference.

BACKGROUND OF THE INVENTION

The present invention relates to a communication system suitable for the transmission of messages from a large number of secondary units to a primary unit, and in a presently preferred implementation relates to improvements in radio data communication systems wherein a number of mobile transceiver units are to transmit data to a base station under a wide range of operating conditions. The invention is preferably to be application as an upgrade of an existing data capture system wherein a number of hand-held transceiver units of an earlier design are already in the field representing a substantial economic investment in comparison to the cost of a base station.

In communication systems, various approaches have been taken to allocating use of a communications link among a large number of terminals. In a sequential polling technique, each of the terminals may be polled in sequence. Each terminal may be required to wait its turn when it has a message to send, and many terminals may be polled which have no messages to send. In a time slot type system, a general poll is sent, and terminals with messages to send respond in random ones of a series of time slots following the general poll. It is conceived that a more efficient and adaptable communication system would result from a fusion of these seemingly incompatible polling techniques.

SUMMARY OF THE INVENTION

An important object of the invention is to provide a multiterminal system and method having increased throughput efficiency in comparison to a system based on either the sequential polling approach or the slotted polling technique as heretofore practiced.

Another important object is to provide such a multiterminal system and method which is automatically dynamically adaptable to varying numbers of active terminals and/or other changing parameters during a given operating time period.

A more specific object of the invention resides in improving the data throughput of low-cost FM or FSK data communications equipment used on existing narrowband channels.

Further objects reside in the provision of a radio data communication system which provides a reliable and efficient communication system and which is dynamically adaptable to a wide range of operating conditions.

Other objects, features and advantages of the present invention will be apparent from the following detailed description taken in connection with the accompanying drawings, and from the respective features of the appended claims taken individually and in cooperative combinations.

DESCRIPTION OF THE DRAWINGS

FIG. 1 is a diagrammatic illustration of an existing prior art radio data system which may be upgraded to incorporate features of the present invention;

FIG. 2 is a diagrammatic illustration of the sequential polling procedure which is utilized with the prior art system of FIG. 1;

FIG. 3 is a diagram illustrating the system timing for the prior art system of FIGS. 1 and 2;

FIG. 4 is a diagram similar to FIG. 3 and illustrating system timing for a prior art system having nearly twice the polling speed of the system of FIGS. 1-3;

FIG. 5 is a diagram similar to FIG. 2 but illustrating a basic protocol in accordance with an aspect of the present invention, and which is to be utilized with a high performance type of mobile terminal unit representing the next generation in comparison to the system represented in FIG. 4;

FIG. 7 is a diagram useful in explaining the logic structure and information flow in a communications system such as represented by the embodiment of FIG. 6.

DETAILED DESCRIPTION

Description of FIGS. 1-4

Figure 6:
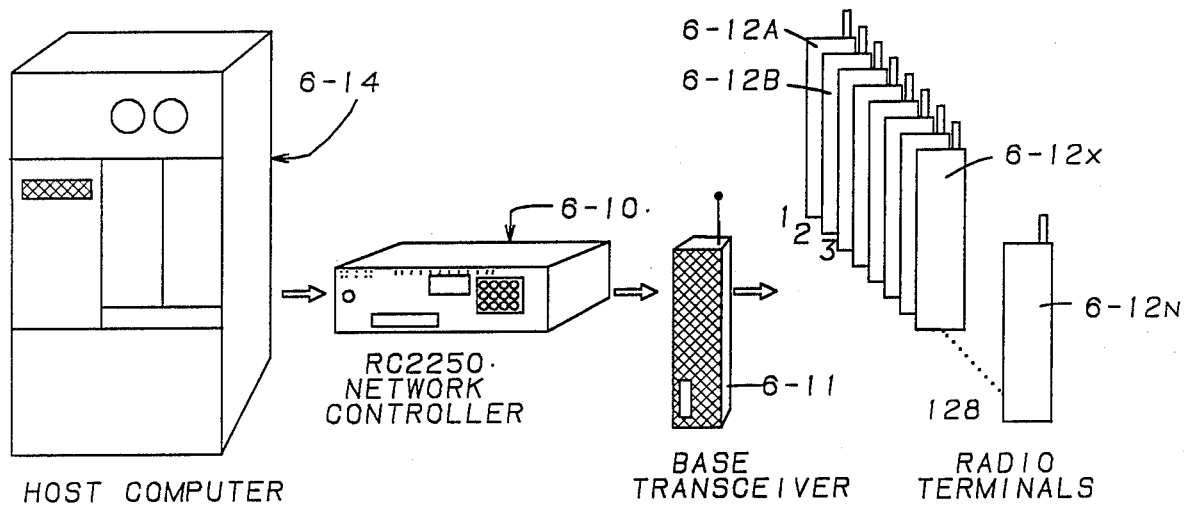
FIG. 6 is a diagrammatic illustration of an embodiment of multiterminal communication system in accordance with the present invention, applied to the field of mobile radio data communication.

FIG. 1 shows an existing radio frequency data transmission system 10 wherein a base station transceiver means 11 has a number of mobile transceiver units such as 12A, 12B, . . . , 12N in radio communication therewith.

By way of example, the base station may be comprised of aa radio base unit 14 such as the model RB1212 of Norand Corporation, Cedar Rapids, Iowa which forms part of a product family known as the RT1200 system. In this case, the radio base 14 may receive data from the respective mobile RF terminals, e.g. of type RT1210, and transmit the received data via a multiplexor 15, e.g. type RM1211, and a communications link 16 (e.g. utilizing an RS-232 format) to a host computer 17.

The data capture terminals 12A, 12B, . . . , 12N may each be provided with a keyboard such as 18, a display as at 19, and a bar code scanning capability, e.g. via an instant bar code reader such as shown in U.S. Pat. No. 4,766,300 issued Aug. 23, 1988 and known commercially as the 20/20 High Performance Bar Code Reader of Norand Corporation.

The RT1200 system utilizes time division multiplexing on a single frequency channel (e.g. in the 450 megahertz band) to provide access to the respective terminals. The RT1200 communicating protocol is based on a sequential polling method that transmits a query addressed to each portable terminal in succession, and allows a specified amount of time for the addressed terminal to respond in case a data message is ready for transmission.

A transmitted message consists of an initialization sequence, unit address, message identifier and system information, message data and/or control commands, error control, and end of message indication.

The basic sequential polling procedure of a base station such as the RB1212 is illustrated FIG. 2 wherein level TX represents transmit mode of the base station, and level RX represents receive mode. In FIG. 2, solid line 21 represents a transmit time interval wherein the base station transmits a polling signal for a mobile unit of a first address, e.g. #0, at a predetermined data rate e.g. 4800 baud. The base station then allows a specified amount of time represented as time interval 22 for the addressed terminal to respond if communication activity is required. The intervals at 23 and 24 apply to a second terminal address, e.g. #1, the intervals 25 and 26 apply to a third terminal address, e.g. #2, the time intervals 27 and 28 represent the operation of a fourth terminal, e.g. #3, and so on.

The sequential polling process is timed by the multiplexor 15, FIG. 1, of the RT1200 system such that if a response is not received from the addressed mobile terminal within the allotted time such as indicated at 22, a poll is issued to the next terminal in the sequence, e.g. as indicated at 23. In the RT1200 system, if the designated mobile unit has some information to send to the host computer 17, that information is immediately transmitted to the host as the response, in which case the base station remains in reception mode. In effect, for the RT1200 system, any of the reception intervals 22, 24, 26, etc. will be extended so as to receive complete messages from the respective addressed terminals where such messages are ready to be sent in response to the respective polling transmissions 21, 23, 25, 27, etc. In FIG. 2, it is assumed that mobile unit #3 is the first unit with a message to send. In this case, the base station while in receive mode as indicated at 28, will actually receive a transmission from mobile unit #3 indicating that a message will follow. The base station in response to the transmission from mobile unit #3 (which is signified by a second line 28A in FIG. 2) remains in receive mode for the duration of the message from unit #3. The message itself from unit #3 may occur over a time interval as represented by dot-dash line 28B, and may be followed by an end of message transmission from unit #3 as indicated by a second line at 28C. In response to the end of message signal at 28C, the base station switches to transmit mode and transmits an acknowledgement message as indicated at 29 for advising unit #3 that the message was properly received.

The base station then resumes polling, e.g. transmitting a polling signal at 30 addressed to a mobile unit #4 and switching to receive mode for an interval 31, and so on. In order to minimize channel capacity that is wasted polling inactive terminals, activity time-outs may be employed so that units that have not transmitted are dropped from the polling sequence and placed in a contention queue. The assumption would be that inactive units are either not being used at all or that the operator is busy at some other activity for significant amounts of time.

FIG. 3 illustrates standard system timing (in milliseconds) for the RT1200 system as represented in FIGS. 1 and 2. As indicated, a polling sequence such as indicated at 21 and 22 in FIG. 2 may occupy an overall time interval of 127 milliseconds, with a poll interval corresponding to interval 21 in FIG. 2 requiring twenty-two milliseconds, a transmit/receive turnaround interval such as represented at 33 in FIG. 2 requiring forty-five milliseconds, and a receive interval such as indicated at 22 in FIG. 2 being allotted fifteen milliseconds.

FIG. 4 illustrates the corresponding standard system timing (in milliseconds) for a second product family known as the RT2200 system of Norand Corporation. In this case, a standard cycle corresponding to the intervals 21, 33, 22 and 34 in FIG. 3 requires a total of sixty-seven milliseconds, polling intervals such as 35 and 36 requiring twenty-two milliseconds, and intervals 37, 38 and 39 each requiring fifteen milliseconds. The shorter transmit to receive and receive to transmit times offered by the RT2200 system result in nearly twice the polling speed in comparison to the RT1200 system. The modulation method and communication bit rates are identical in the two system families so that it is possible for the components of the RT1200 and RT2200 systems to be mixed subject to some limitations. For example, any mix of terminals or bases that includes an RT1211 multiplexor or an RT1212 base requires that the forty-five millisecond intervals such as 33 and 34 be included during communication involving these components. More particularly, if either the RT1212 base station or RT1211 multiplexor is used with a mixture of RT1210 and RT2210 terminals, all terminals must respond using the slower (45 ms) delay. If these units are replaced with both the RB2212 base, and RM2216 multiplexor, the system has the capability of adjusting the delay to match the particular terminals in use. For example, if units #1, #5, and #7 are RT2210's, and units #2, #3, #4, and #6 are RT1210's, the former three will be polled using the 15 ms delay, the latter four will be polled using the 45 ms delay.

Description of FIG. 5

In a more recent commercial development, a type of mobile terminal unit is to be utilized that includes a high performance 16-bit microprocessor and a memory capacity that allows large and complex application programs to reside and be executed within the terminal. With the introduction of this terminal, which is identified as the RT2210 Radio Data Terminal of Norand Corporation, it is particularly convenient to load the basic terminal with programming so that the resultant programmed terminal will operate as part of an embodiment of a communication system in accordance with the present invention. Such a programmed terminal may interact with a primary communications controller according to a sequence of events such as illustrated in FIG. 5. Implementation of this embodiment of the invention may be effected by means of a new read only memory (firmware) to be loaded into the RT2210 basic terminal, for example.

As shown in FIG. 5 a multiterminal polling message such as indicated at 40 is transmitted to all terminals in the system, and the terminals are allowed to respond in random "time slots" such as indicated at 41-44 to indicate to the controller that communication activity is desired by the terminal. The example in FIG. 5 provides four time slots 41-44 in which the terminals may respond to the poll. In practice, the number of time slots are varied depending on the traffic load and other conditions. Each terminal may respond to the poll 40 in any of the desired time slots with its address and some positive acknowledgement. The particular time slot in which the terminal chooses to communicate is selected at random by the terminal. In the event that several terminals - potentially more than the number of time slots available, desire communications, a good probability may remain that at least one of the terminals will transmit its response in a time slot which is free of other responses. Under light loading conditions, it is likely that more than one slot will contain an intelligible response message, which further improves the efficiency of the polling procedure. An additional efficiency improvement may be realized because of a "capture" phenomenon of radio frequency modulation that allows recovery of a relatively strong signal in the presence of a relatively weak interfering signal.

Referring to FIG. 5, it may be that a terminal unit with an address of #3 responded during the first time slot 41, and that a terminal unit #0 responded in time slot 43. Several terminal units may have simultaneously responded in time slot 42 such that none was identified by the base station. In such a case, the base station after elapse of time intervals 41–44, may first transmit a polling signal 51 addressed to terminal unit #3, and then receive a message from unit #3 as indicated at 52. As in FIG. 2, the message received at 52 may include a preamble indicated at 42A, a message proper 52B, and an end of message signal 52C. The base station may then transmit an acknowledgement message as represented at 53, and thereafter proceed during time interval 54 to poll the next terminal unit, e.g. #0, which successfully responded to the general poll at 40. The message from terminal unit #0 may include message components such as described for message 52. After each successfully responding mobile terminal has been polled and its respective message received, the procedure may be repeated with a further multiterminal polling cycle as at 40–44. The technique illustrated in FIG. 5 is herein termed slotted reservation-access polling since secondary terminal units with a message to communicate issue responses in randomly selected slots which merely seek entry to a queue of secondary units desiring to transmit on the same channel as used for polling, (that is, the responding secondary units seek to reserve a future time allocation from the primary unit for sharing the single common channel, at which future time each successful secondary unit will be granted access to the primary unit via such single common channel in accordance with its reservation).

Description of FIG. 6

FIG. 6 shows an exemplary multiterminal communications system in accordance with the present invention. In this embodiment a type RC2250 network controller of Norand Corporation is programmed according to a protocol embodiment known as the RTC protocol so as to provide a programmed network controller means 6–10. In this particular embodiment which is in successful operation, a base transceiver 6–11 is in a separate housing from the controller means 6–10 and utilizes an existing product of Norand Corporation known as the Model RB2212 base station transceiver.

In the specific example of FIG. 6, the network controller means 6–10 manages all communication and processing of data between a group of radio terminals such as indicated at 6–12A, 6–12B, . . . ,6–12X, . . . 6–12N, and a host computer 6–14. Each radio terminal may be a separate hand-held or vehicle-mounted unit comprised of a Model RT2210 commercial product of Norand Corporation with firmware programming so as to coact with the controller system 6–10 according to a protocol embodiment known as the RTC protocol.

Description of FIG. 7

In APPENDIX A to the present specification, a detailed document covering the RTC protocol embodiment is reproduced. This document presents the information required to readily implement the embodiment of FIG. 6.

For the sake of an introduction to descriptive terminology, the following discussion in relation to FIG. 7 is presented. While the present discussion includes aspects dependent on the particular example of FIG. 6, the application of the teachings herein e.g. to a local area network without radio links, will be apparent to those skilled in the art from the present disclosure.

Referring to Section 2.0 COMMAND LINE of APPENDIX A, an exemplary command for the system of FIG. 6 might appear as follows: run rtc -d190(H)-i1f0(H)-q3 where the symbol (H) simply indicates that the preceding two characters are in hexadecimal notation for purposes of the present description. Referring to APPENDIX A (Page One), the command line indicates that the address of the first data port is 90(H), the interrupt number for the first data port is F0(H), and the queue number to use for the queue indicated at 7–15 is three. It will be noted that for the present implementation the data packet size may have a value of 128 bytes while the number of secondary terminal units such as 7–12A, 7–12B, . . . , 7–12X . . . , 7–12N may be any number up to 128. Where the symbol (H) is omitted, ordinary decimal notation is intended in the present text.

Referring to Section 3.0 RTC PROGRAM INTERFACE OF APPENDIX A, the system of FIG. 7 uses two queues 7–14, 7–15 for communication with a higher layer, termed host means 7–10. The queue 7–14 is used to pass messages into the RTC task means 7–11 from host means 7–10, and queue 7–15 is used to pass messages to the host means 7–10.

The messages are passed on control structures called buffers as defined in Section 3.0. (All Section numbers herein refer to APPENDIX A.) For queues 7–14 and 7–15 a chain of buffers according to the present example are to be on successive entries in the queue.

Section 3.1 enumerates the types of messages which may be supplied to task means 7–11 via queue 7–14. Such messages may of course originate at a host computer such as indicated at 6–14, FIGS. 6 and 7. Referring to Section 3.1.1, data for a given terminal unit such as 7–12B may be supplied by task means 7–11 to a corresponding terminal queue such as the queue indicated at 7–20B, and will thereafter be transmitted in its turn e.g. on a first-in, first-out basis.

In Section 3.1.3, the version inquiry may be used to identify the particular version number of programming in a selected terminal where different terminals may have different version of the basic RTC programming.

In Section 3.1.7, the RTC MUX may be implemented by programming of the processor of network controller means 6–10. Such processor may be a type 80186 microprocessor in this particular embodiment. In this way a separate multiplexer unit (such as the RM 1211 multiplexer of FIG. 1) is not required. The function of a multiplexer is represented at 7–21 in FIG. 7.

As indicated in Section 3.1.12, the slot configuration as represented at 41–44 in FIG. 5 may be changed during system operation, e.g. by changing the specification as to the numbers of slots which may be randomly selected by the secondary terminal units. The number of slots of a given duration may be specified as part of each multiterminal message such as 40, FIG. 5, but an initial slot or an initial set of slots may be made unavailable by selecting as the initial slot value a slot position such as 42 (initial slot value equals e.g. two) or such as 43 (initial slot value equals three). The effect is to introduce added delay between the multiterminal poll e.g. at 40 and the first time slot which may be selected by a responding terminal or responding terminals. The system may automatically and dynamically select the number of available slots e.g. as registered at slot size means 7-25, beginning with the initial slot value e.g. as registered at initial slot value means 7-28. Such number of available slots may be automatically adjusted., e.g. for each multiterminal poll, within the limits specified by the minimum and maximum slot values registered at 7-26 and 7-27.

Section 3.1.14 of APPENDIX A shows the command for enabling operation with adaptive control of baud rate as described in detail in the incorporated patent application of Ronald L. Mahany Ser. No. 07/228,355 filed Aug. 4, 1988.

Referring to Section 3.2 of APPENDIX A, the RTC task means 7-11, places messages as enumerated in the Section in queue 7-5 for supply via host means 7-10 e.g. to host computer 6-14. The host means 7-10 may be viewed as including a router means indicated at 7-30 for determining the disposition to be made of messages received from the queue 7-15. For example, referring to Section 3.2.1, the host means 7-10 may decide if terminal data received from queue 7-15 should be sent to the host or not In section 3.2.4 of APPENDIX A, the terminal types are represented by two digit decimal numbers the "D" following each two digit number indicating decimal notation.

Section 4.0 of APPENDIX A is headed RTC Primary Station Routines and Section 5.0 refers to a RTC Second State Machine. These sections discuss the programming and data structures employed in primary task means or primary processor means 7-11, and in secondary task means or secondary processor means 7-12A, 7-12B, . . . ,7-12X, . . . , 7-12N (and collectively designated 7-12), respectively.

The primary finite state machine of primary processor means 7-11 is described in Section 4.3, and includes individual unit finite state machines collectively designated by reference numeral 7-41, and individually indicated at 7-41A, 7-41B, . . . , 7-41X, . . . , 7-41N. The routine represented as SEND UP means 7-31 is designated in the programming of the primary processor means 7-11 with the notation rtc_send_up and functions to send an UP command via link means 7-22 to the respective secondary finite state machines or secondary units 7-12A, 7-12B, . . . , 7-12X, . . . , 7-12N. In response thereto, the secondary units may randomly select time slots according to respective slots parameters from slot parameter tables as indicated e.g. at 7-32A and 7-33A for secondary unit 7-12A.

For example, if the initial slot value is three, and slot size is twenty, a maximum of twenty units may succeed in sending response bursts in time slots such as 43,44, FIG. 5, which are correctly received by the primary processor means 7-11. A list of the addresses of identification means (such as 7-1201, 7-1202, . . . , 7-12FF) of the secondary units which transmit valid responses are then entered in an UP QUEUE means 7-50 (designated UP_queue in Section 4.0). The primary processor means under the control of the send_UP routine given by way of example in Section 4.2 may first send its slot size parameter at 7-25 to all secondary units, e.g. as part of a poll message. The secondary units then may select response time slots according to this transmitted slot size as stored at 7-33A, etc., and initial slot values as already stored at 7-32A, etc. The primary processor means 7-11 may count the number of secondary units represented in the UP QUEUE means 7-50 (termed up_q_count in Section 4.2), and if this number is greater than zero, a new slot size value may be entered into slot size means 7-25, equal to the value stored at minimum slot value means 7-27, e.g. ten.

For the illustrated embodiment, the link 7-22 can be simultaneously accessed by more than one secondary unit, the result being a garbled message burst at the receiver of 7-21. Such garbled messages will be recognized as invalid (using any suitable validity check such as the CRC-16 check value of Section 6.1), and will be counted as a collision by collision sense means of 7-21. As represented in Section 4.2, the send_UP routine may respond to the presence of collisions in a selected number of available time slots to increase the slot value at slot size means 7-25 by an increment value (slot_inc, Section 4.2) which may be selected e.g. as an increment value of one at start up of the system. As indicated in Section 4.2, if the new value of slot size is greater than the maximum value at 7-27 (max_slot_size, Section 4.2) then the contents of known queue means 7-51 is transferred to UP queue means 7-50.

Referring to Section 6.2.1, the primary processor means 7-11 may send a multiterminal polling message such as the following to all secondary terminal units: <FF(H)><FF(H)><8A(H)This is termed in Section 6.2.1 an UNNUMBERED POLL, and may also be referred to as a multiterminal poll to distinguish it from a poll directed to a specific secondary terminal (as at 51, FIG. 5). The first segment of the multiterminal polling message is the broadcast address (Section 6.2.1) or multiterminal address. The second segment is the RTC command byte (Section 6.2.1) which may represent the UP command (see Section 6.2). The third segment of the multiterminal polling message may represent the number of response time slots available for the response, e.g. ten such slots of forty milliseconds each.

The multiterminal polling message may include a fourth segment giving the addresses of terminals for which messages are pending e.g. at TXQ means such as 7-20B of primary processor means 7-11.

If a secondary terminal which receives the multiterminal message notes its address in the fourth segment, or itself has a message to send, such secondary terminal will randomly select which of the specified time slots to answer in. The secondary terminal will respond with the basic RTC frame (Section 6.1) inserting its address, e.g. 02(H) for terminal 7-12B, in the address field, and the UP command FF(H) in the command field. Such a response burst is of duration less than that of a time slot.

The timeout means 7-52 may control various timeout functions such as the waiting time of the primary processing means 7-11 after transmission of a multiterminal polling message in the absence of response bursts from the secondary terminals or before sending poll messages directed to specific terminals. The TIMEOUT interval may be based on the values in initial slot value means 7-28 and the slot size value in means 7-25 (which will reflect any new slot size specified in the multiterminal polling message). For example, where the initial value is three and the slot size is ten, timeout means 7-52 may effect a corresponding timing cycle (e.g. 520 milliseconds) before sending further messages.

Where a terminal such as 7-12B has successfully responded to a multiterminal poll, the primary processing means (before the timeout means 7-52 has provided a timeout interrupt), may be advised that the temporary buffer means 7-54 has received a valid response, termed "receive" in the polling procedure of Section 4.1. Thereupon the primary processor means may establish the event "process buffer" (event=process buffer, Section 4.1) whereupon the UP queue means 7-50 will be advised that terminal 7-12B is active, and the individual unit means 7-41B will be updated to show that terminal 7-12B is ready to be polled for its message.

If another secondary terminal 7-12X (e.g. with address 112, or 70 Hexadecimal) has a message at its TRFCB means 7-57X, and enters its address at another time slot in response to the multiterminal polling message, then the primary processor means will process this response also and revise the corresponding individual unit means 7-41X for this address.

When the timeout means 7-52 shows the expiration of the unnumbered or multiterminal polling cycle time, the primary processing means may utilize the POLLx frame (Section 6.2.2) to poll specific secondary units such as 7-12X for data. Where there is data as at 7-20B to send, the primary processor means may proceed to send the data using the DATA FRAME of Section 6.2.3.

Where data is to be received from a terminal such as 7-12X, the terminal responds to the POLLx command (with the NO DATA bit not set, Section 6.2.3) by sending a data frame based on data stored at 7-57X. The primary processor means acknowledges receipt with a suitable POLLx frame (Section 6.2.2, item 2), and will store the data at RXQ means 7-58X of individual unit means 7-41X.

SUMMARY OF EXEMPLARY FEATURES

In accordance with an aspect of the present invention, the primary processor means may have a list of known secondary units (e.g. at 7-60) and a list of currently active secondary units (e.g. at 7-50). A count of currently active secondary units (e.g. at 7-61) may be maintained and each multiterminal poll may specify a number of slots (e.g. from 7-25) which is dynamically adjusted in accordance with such count (up-q-count, section 4.2) and in accordance with number of collisions (e.g. at 7-62) experienced in a sample number of recent polling cycles.

Since the system has provision for an initial slot value (e.g. at 7-28), and since the secondary terminals can register a corresponding initial slot value (e.g. at 7-32A, etc.), the primary processor means in its multiterminal polling message can assign a specific slot in which a given terminal clan respond. Such specific slot could be the initial slot value minus one if there were sufficient priority messages to warrant a reserved slot during an operating time of relatively long duration. Where there are less than FF(H) actual terminals, a high order bit in the address segment (Section 6.1.1) could signal a secondary unit with address giving in lower order bits to respond in the reserved time slot (e.g. initial slot value minus one or slot 41, FIG. 5, where the initial slot value was two).

SUMMARY OF THE INVENTION

In general, the configuration of a system such as indicated in FIG. 7 with suitable start up parameters, and the synchronization of the secondary units 7-12 with the primary processor means 7-11 may take place analogously as in a prior art system such as shown in FIGS. 1,2,3 and 4.

The detailed structure of the new types of messages is given in APPENDIX A hereto; see for example, Section 6.2.1 of APPENDIX A concerning the multiterminal polling message or UNNUMBERED POLL, which corresponds with the poll at 40 in FIG. 5.

In accordance with the teachings of the present invention, a multiterminal poll such as represented at 40 in FIG. 5 may include a slot size parameter (slot size, Section 4.2 of APPENDIX A) which specifies the number of time slots such as 41 to 44, FIG. 5, which may be utilized by responding terminals. This slot size may be dynamically varied during normal operation of the system according to a current number of active terminals, e.g. which are answering individually addressed polls within a specified number of retries (Max Retry means 7-70). See the procedure for processing each secondary unit 7-12 which is listed in UP QUEUE means 7-50, as found in Section 4.0 of APPENDIX A hereto. The dynamic variation of slot size is apparent form the send_UP routine given in Section 4.2 of APPENDIX A.

Another feature apparent from Section 6.2.1 of APPENDIX A is the ability to include optional addresses in the multiterminal polling message. This is particularly valuable for a system having appreciable transmit/receive turnaround time e.g. as represented in FIGS. 3 and 4. The contemporaneous transmission of the multiterminal polling message and message segments concerning slot parameters and/or specific terminals addresses is a particularly important aspect of the preferred system and method when utilizing a half-duplex link means 7-22 based e.g. on single channel RF transmission or the like.

It will be apparent that many modifications and variations may be effected without departing from the scope of the teachings and concepts of the present invention.

APPENDIX A referred to in the present specification contains Sections 1.0 through 7.3.

APPENDIX B follows APPENDIX A and shows exemplary program listings for the system as described in APPENDIX A.

APPENDIX A 1.0 SCOPE

This document will cover the RTC protocol, tasks, and interfaces for use on the RC2250 and future use on the LAN Controller.

2.0 COMMAND LINE

To execute the RTC protocol from the command line the following format is used:

```
run rtc <options> where options are:
        -d1n            -- indicates the address of the first data
                           port. default is 86H
        -c1n            -- indicates the address of the first
                           command. port default is 84H
        -i1n            -- indicates the interrupt number to use
                           for first communication port
                           default is E0H
        -p1n            -- indicates the port of the controller to
                           use for first communication port.
                           a 1 indicates Port A of the SCC
                           a 0 indicates Port B of the SCC
                           default is Port A
        -d2n            -- indicates the address of the second
                           data port. default is 86H
        -c2n            -- indicates the address of the second
                           command. port default is 84H
        -i2n            -- indicates the interrupt number to use
                           for second communication port
                           default is E0H
        -p2n            -- indicates the port of the controller to
                           use for second communication port.
                           a 1 indicates Port A of the SCC
                           a 0 indicates Port B of the SCC
                           default is Port A
        -k              -- enable customer extensions
                           default is disabled
        -s              -- enable SNA extensions
                           default is disabled
        -qn             -- indicates the queue number to use for
                           RTC_OUT_Q. RTC_IN_Q is RTC_OUT_Q+1
                           default is RTC_OUT_Q is 22 and RTC_IN_Q
                           is 23.
        -xn             -- indicates data packet size
                           default is 128.
        -nn             -- number of terminals to support
                           default is 128
```

This can be also enable by using the memrun call from inside a
task.

3.0 RTC program interface

RTC uses two queues for communication to with a higher layer.
These queues are named RTC_OUT_Q (default is 22) and RTC_IN_Q
(default is 23). The RTC_IN_Q is used to pass message into the
RTC task from a higher task and RTC_OUT_Q is used to pass
messages to the higher task. If the queue numbers are different
than the default values the values can be changed from the
command line.

The messages are passed in control structures called buffers.
These buffers are allocated at system startup and place on a
global queue so all tasks can used. The files buffer.h and
buffer.c must be common to all the programs so a uniform use of
the buffers can be impose. The struct of a buffer is as follows:

```
    typedef struct BUFFER
    {
        struct BUFFER far *next;
        unsigned char chain_status;
        unsigned type;
```

```
        unsigned length;
        unsigned address;
        unsigned char data[132];
    } buffer;
``` where:
    next                    defines a field to allow queuing of buffers.
    chain_status      defines if a larger buffer is being segmented.

FIC (0x10) means this is the first buffer in the chain
                    MIC (0x00) means this is a middle buffer in the chain
                    LIC (0x20) means this buffer is the last buffer in the chain
                    OIC (0x30) means this buffer is the only buffer in the chain On the RTC_IN_Q and RTC_OUT_Q, a chain of buffers must be on successive entries in the queue or the program will act totally out of spec.

type                    defines a action code to be implemented. see following for action codes.

length                length of data in the data portion of the buffer. RTC supports a data field up to 128 bytes long. Data is place here that needs to be used in processing.

3.1 RTC_IN_Q Messages

The RTC task uses the buffer format above to accept messages on the RTC_IN_Q to indicate actions.

3.1.1 RF_DATA (type = 0)

This indicates there is data for the terminal with the address in the address field. The chain_status field indicates whether this is a FIC,MIC,LIC or OIC. The RTC task will take this data and queue it to the terminal for transmission. All buffers from FIC to LIC (or only OIC) must be chain together by the next field of the BUFFER with the last buffer of chain must be a NULL pointer.

3.1.2 RF_TEST (type = 1)

This indicates that the terminal with the address in the address field should be sent a loopback test and when completed this must be sent to the host. The chain_status must be OIC.

3.1.3 RF_VERSION (type = 2)

A version inquiry should be sent to the terminal with the address in the address field. The resulting respond must be sent to the host. The chain_status must be OIC.

3.1.4 RF_ENABLE (type = 3)

This enable a terminal with the address in the address field. The chain_status must be OIC.

3.1.5 RF_DISABLE (type = 4)

This disable a terminal with the address in the address field. The chain_status must be OIC.

3.1.6 RF_REBOOT (type = 5)

This resets a terminal with the address in the address field. The chain_status must be OIC. If a terminal was previously disabled then the terminal will now be enabled. A value of -1 in the address field will force all active terminals to be rebooted.

3.1.7 RF_RESET (type = 6)

This informs the RTC MUX to reset it self to a beginning state. Once this is completed a RF_RESETED command is sent out the RTC_OUT_Q to inform the higher layers that it has been reset. The chain_status must be OIC.

3.1.8 RF_MSTAT (type = 12)

This inquires the RTC MUX about the status of messages for the terminal with the address in the address field. (see section 3.2.6 for format of response) A address field of -1 means to return a buffer filled with information for all the terminals.

3.1.9 RF_HALT (type = 13)

This tells the RTC MUX to suspend operations until a RF_GO buffer is received. This can be used to disable the RTC MUX if a host outage occurred.

3.1.10 RF_GO (type = 14)

This informs the RTC MUX that was suspended by a RF_HALT command to resume operations.

3.1.11 RF_CCS (type = 15)

This passes the FCC callsign string to the RTC task. Must be OIC and length of callsign string indicated by the length field.

3.1.12 RF_SLOTS (type = 16)

This is used to send a configuration message to the RTC MUX. Format of RF_SLOTS message is as follows:

```
    typedef struct
    {
        unsigned char min_slots;        /* minimum slot
                                           value for RTC */
        unsigned char max_slots;        /* Maximum slot
                                           value for RTC */
        unsigned char slots;            /* initial slot
                                           value */
    } slot,*slot_ptr;
```

The chain_status must be OIC.

3.1.13 RF_PORT (type = 17)

This is used to enable dual base support in the RTC task.

3.1.14 RF_SPEED (type = 18)

This is used to enabl 4800/9600 dual baud rate support in the RTC task.

3.2 RTC_OUT_Q Messages

The RTC task uses the buffer format above to accept messages on the RTC_OUT_Q to indicate events that has occurred.

3.2.1 RF_DATA (type = 0)

This indicates there is data form the terminal with the address in the address field. The chain_status field indicates whether this is a FIC,MIC,LIC or OIC. The higher layers must decide if it wants to sent the data to the host or not. If the amount data received is greater that 1 buffer size then the each buffer is chained to the first buffer from FIC to LIC with the last buffer in the chain next field is a NULL pointer.

3.2.2 RF_TEST (type = 1)

This indicates that the terminal with the address in the address field has responded to test indication and this is the result. The chain_status must be OIC.

3.2.3 RF_VERSION (type = 2)

A version reply was received from the terminal with the address in the address field. The resulting respond must be sent to the host. The chain_status must be OIC.

3.2.4 RF_REBOOT (type = 5)

This informs the router that the terminal with the address in the address field has been just powered up or perform a protocol reset. The chain_status must be OIC. The buffer contains 1 byte of data that identifies the terminal type of the terminal that was just reseted. The values are:

| Device | Data Stream | Terminal Type |
| --- | --- | --- |
| 2250 |  | 80D |
| PCMUX |  | 81D |
| 1210E | 3270 | 11D |
| 2210 | Native | 20D |
| 2210 | 3270 | 21D |
| 3210 | Native | 30D |
| 3210 | 3210 | 31D |
| 3210 | Extended | 32D |
| 4210 |  | 40D |

3.2.5 RF_RESETED (type = 7)

This informs the router that the RTC MUX has completed resetting itself. The chain_status must be OIC.

3.2.6 RF_MSTAT (type = 12)

This informs the router the status of messages for the terminal with the address in the address field. The chain_status must be OIC. The length field must be equal to 1. The first byte of data must be one of the following:

1 -- Terminal is disabled

2 -- Terminal has no pending message
3 -- Terminal has a pending message
4 -- Terminal has a message pending which exceeds inactivity timeout.

4.0 RTC Primary Station Routines

The major routines for an RTC primary station are a main control loop, a send UP routine, and a individual unit finite state machine. These are:

- rtc_main — This routine will be a infintite loop for processing.
- rtc_send_up — This will send a UP command on the link and return UP_queue with all valid responses
- rtc_prifsm — This fsm will handle the finite state machine for the primary side of a connection with a secondary unit. The return value will indicate whether a i-frame was received, the unit is done or a reset has occurred.

The following data structures are needed by the a primary station.

- UP_queue — list of all secondary responding to UP.
- known_queue — list of all known secondaries.
- secondary — array of data structures (defined below) that maintain all information needed to manage each secondary.
- max_retry — the retry number for timeouts before the main loop goes on to the next unit.

The secondary data structure must include:

- address — the secondary's address
- VR — next expected ACK
- VS — next ACK to send
- state — the state for the prifsm.
- event — inputs for the prifsm major categories
- txq — queue of data to send to the secondary
- rxq — queue of data from the secondary

4.1 RTC_MAIN

The procedure to perform main control of the RTC primary control software is as follows:

```
init
    known_list=empty do forever

UP_queue = empty
    check for terminals going inactive
    check for input messages to the RTC
    rtc_send_up
    for each secondary in UP_queue
        if secondary is not in known_list
            add secondary to known_list
        endif
        retry = 0
```

```
                    event is set to idle event
                while (execute primary fsm is not done)
                    wait receive
                    if (event != TIMEOUT)
                        event = process buffer
                    if (event == TIMEOUT)
                        if (retry < max_retry)
                            increment retry
                            event is set to idle event
                        endif
                    endif
                end
        end
end
```

The primary will poll a secondary until all data has been received from the secondary.

4.2 RTC_SEND_UP

The rtc_send_up routine will be as follows:

```
loop
      send UP(slotsize,secondarys that are in RESET state or has
                      data on their txq)
      receive UP(slotsize)
      if up_q_count > 0
        slotsize = min_slot_size
        exit
      elseif collisions
        slotsize = slotsize + slot_inc
        if slotsize > max_slot_size
            enqueue all known_list to up_queue
            exit
        endif
      else
        slotsize = min_slot_size
        up_q_count = 0.
        exit
      endif
endloop
```

4.3 RTC PRIMARY STATE MACHINE

The following is a state table for the RTC Primary state Machine. The states are across the top and events are down the side. The states are RESET, NORM, RSP (NORM mode with an outstanding unacknowledged DATA frame), VERSION, and TEST.

Each state entry consists of four lines. Line one indicates the frame to be sent. Line two indicates the state transition. Line three indicates the action to take. The action is a letter from the table following the state table. Line four indicates if the state machine returns done if no further output is perform and not done (!done) if output occurred and the rtc_main needs to wait for input.

Each input entry consist of three lines. Line 1 indicates the frame level input. Line 2 indicates the state of trfcb and line 3 indicates rrfcb state.

The TRFCB can be in one of three states. NULL is when the trfcb
has nothing in it or the TRFCB has sent all its data and is
awaiting a acknowledgment of the last frame. Data indicates that
there is data yet to be transfer.

The RRFCB can be in one of three states. NULL is when the rrfcb
has nothing in it. Data indicates that there is room available
for data to be transfer into and FULL indicates no more room
available for data to be transfers into.

PRIMARY STATE TABLE

| Inputs | RESET | NORM | RSP | TEST | VERSION |
|---|---|---|---|---|---|
| IDLE<br>No Data<br>-<br>IDLE0_EVENT | RESET<br>RESET<br>!done | POLL<br>NORM<br>!done | POLL(N)<br>RSP<br>!done | RESET<br>done | RESET<br>done |
| IDLE<br>Data<br>-<br>IDLE1_EVENT | RESET<br>RESET<br>!done | DATA<br>RSP<br>c<br>!done | POLL(N)<br>RSP<br>!done | RESET<br>done | RESET<br>done |
| IDLE<br>Data<br>-<br>IDLE2_EVENT | RESET<br>RESET<br>!done | DATA<br>RSP<br>c<br>!done | POLL(N)<br>RSP<br>!done | RESET<br>done | RESET<br>done |
| IDLE<br>TEST<br>-<br>IDLE3_EVENT | RESET<br>RESET<br>!done | TEST<br>TEST<br>!done | RESET<br>done | RESET<br>done | RESET<br>done |
| IDLE<br>VERSION<br>-<br>IDLE4_EVENT | RESET<br>RESET<br>!done | VERSION<br>VERSION<br>!done | RESET<br>done | RESET<br>done | RESET<br>done |
| timeout<br>-<br>-<br>TIMEOUT_EVENT | RESET<br>done | NORM<br>done | RSP<br>done | NORM<br>done | NORM<br>done |
| RESET<br>-<br>-<br>RESET_EVENT | NORM<br>a<br>!done | RESET<br>done | RESET<br>done | RESET<br>done | RESET<br>done |
| TEST<br>-<br>-<br>TEST_EVENT | RESET<br>b<br>done | RESET<br>b<br>done | RESET<br>b<br>done | NORM<br>i<br>done | RESET<br>b<br>done |
| VERSION<br>-<br>-<br>VERSION_EVENT | RESET<br>b<br>done | RESET<br>b<br>done | RESET<br>b<br>done | RESET<br>b<br>done | NORM<br>j<br>done |

PRIMARY STATE TABLE (continue)

| Inputs | RESET | NORM | RSP | TEST | VERSION |
|---|---|---|---|---|---|
| ACK = VS<br>NULL<br>-<br>ACK0_EVENT | RESET<br>done | NORM<br>done | NORM<br>e<br>done | RESET<br>done | RESET<br>done |
| ACK = VS<br>DATA<br>-<br>ACK1_EVENT | RESET<br>done | NORM<br>done | DATA<br>RSP<br>f<br>done | RESET<br>done | RESET<br>done |
| ACK != ACK_RCV<br>-<br>-<br>ACK2_EVENT | RESET<br>done | RESET<br>done | LASTDATA<br>RSP<br>!done | RESET<br>done | RESET<br>done |
| ACK = VS<br>NULL<br>-<br>ACKN0_EVENT | RESET<br>done | NORM<br>done | NORM<br>e<br>done | RESET<br>done | RESET<br>done |
| ACK = VS<br>DATA<br>-<br>ACKN1_EVENT | RESET<br>done | NORM<br>done | RSP<br>g<br>done | RESET<br>done | RESET<br>done |
| ACK != ACK_RCV<br>-<br>-<br>ACKN2_EVENT | RESET<br>done | RESET<br>done | RSP<br>h<br>done | RESET<br>done | RESET<br>done |
| DATA<br>-<br>NULL<br>DATA0_EVENT | RESET<br>done | NORM<br>done | RESET<br>done | RESET<br>done | RESET<br>done |
| DATA<br>-<br>DATA<br>DATA1_EVENT | RESET<br>b<br>done | POLL<br>NORM<br>d<br>!done | RESET<br>b<br>done | RESET<br>b<br>done | RESET<br>b<br>done |
| DATA<br>-<br>FULL<br>DATA2_EVENT | RESET<br>done | RESET<br>done | RESET<br>done | RESET<br>done | RESET<br>done |
| TERROR<br>-<br>-<br>TERROR_EVENT | RESET<br>done | RESET<br>done | RESET<br>done | RESET<br>done | RESET<br>done | where    a -- reset vr=vs=0
            release txq and rxq data
            send reset indication
     b -- release buff_temp from rtc_rx routines
     c -- vs = vs+1

PRIMARY STATE TABLE (continued)

```
d -- accept data
       if data is LIC
         send data indication
       vr = vr+1
e -- release previous data buffer
       indicate data was send
f -- release previous data buffer
       vs = vs+1
g -- release previous data buffer
h -- vs = vs-1
i -- send test indication
j -- send version indication
```

5.0 RTC Secondary State Machine

The following is a state table for the RTC Secondary state Machine. The states are across the top and events are down the side. The states are RESET, NORM, and RSP (NORM mode with an outstanding unacknowledged DATA frame).

Each state entry consists of four lines. Line one indicates the frame to be sent. Line two indicates the state transition. Line three indicates the action to take. The action is a letter from the table following the state table.

Each input entry consist of three lines. Line 1 indicates the frame level input. Line 2 indicates the state of trfcb and line 3 indicates rrfcb.

The TRFCB can be in one of three states. NULL is when the trfcb has nothing in it or the TRFCB has sent all its data and is awaiting a acknowledgment of the last frame. Data indicates that there is data yet to be transfer.

The RRFCB can be in one of three states. NULL is when the rrfcb has nothing in it. Data indicates that there is room available for data to be transfer into and No Data indicates no more room available for data to be transfers into.

SECONDARY STATE TABLE

| Inputs | RESET | NORM | RSP |
|---|---|---|---|
| RESET<br>-<br>-<br>RESET_EVENT | RESET<br>NORM<br>a | RESET<br>NORM<br>a | RESET<br>NORM<br>a |
| POLL=VS<br>NULL<br>NULL<br>POLL0_EVENT | RESET<br>RESET | POLL(N,VR)<br>NORM | POLL(N,VR)<br>NORM<br>b |
| POLL=VS<br>NULL<br>Data or No Data<br>POLL1_EVENT | RESET<br>RESET | POLL(VR)<br>NORM | POLL(VR)<br>NORM<br>b |
| POLL=VS<br>Data<br>-<br>POLL2_EVENT | RESET<br>RESET | DATA(VS)<br>RSP<br>c | DATA(VS)<br>RSP<br>d |
| POLL!=VS<br>-<br>-<br>POLL3_EVENT | RESET<br>RESET | RESET<br>RESET | DATA(VS-1)<br>RSP |
| POLL(N)=VS<br>NULL<br>NULL<br>POLLN0_EVENT | RESET<br>RESET | POLL(N,VR)<br>NORM | POLL(N,VR)<br>NORM<br>b |
| POLL(N)=VS<br>NULL<br>Data or No Data<br>POLLN1_EVENT | RESET<br>RESET | POLL(VR)<br>NORM | POLL(VR)<br>NORM<br>b |
| POLL(N)=VS<br>Data<br>-<br>POLLN2_EVENT | RESET<br>RESET | POLL(VR)<br>NORM | POLL(VR)<br>RSP |
| POLL(N)!=VS<br>-<br>-<br>POLLN3_EVENT | RESET<br>RESET | RESET<br>RESET | DATA(VS-1)<br>RESET |

SECONDARY STATE TABLE (continue)

| Inputs | RESET | NORM | RSP |
|---|---|---|---|
| DATA<br>-<br>NULL<br>D0_EVENT | RESET<br>RESET | POLL(N,VR)<br>NORM | POLL(N,VR)<br>RSP |
| DATA<br>-<br>Data<br>D1_EVENT | RESET<br>RESET | POLL(VR+1)<br>NORM<br>e | POLL(VR+1)<br>NORM<br>e |
| DATA<br>-<br>No Data<br>D2_EVENT | RESET<br>RESET | RESET<br>RESET | RESET<br>RESET |
| TEST<br>-<br>-<br>TEST_EVENT | TEST<br>RESET | TEST<br>NORM | TEST<br>RSP |
| VERSION<br>-<br>-<br>XID_EVENT | VERSION<br>RESET | VERSION<br>NORM | VERSION<br>RSP |
| UP<br>NULL<br>-<br>UP0_EVENT | RESET | NORM | RSP |
| UP<br>DATA<br>-<br>UP0_EVENT | RESET | UP<br>NORM | UP<br>RSP |
| UP(addr)<br>-<br>-<br>UP1_EVENT | UP<br>RESET | UP<br>NORM | UP<br>RSP |

SECONDAY STATE TABLE (continued)

ACTIONS

```
a -- trfcb->status = reset.
     rrfcb->status = reset.
     tx_done.
     rx_done.
     VS = VR = 0 b -- trfcb->status = good.
     tx_done.

c -- Set FIC indication.
     If last buffer
         set LIC indication.
     VS = VS+1.

d -- Set MIC indication.
     if last buffer
         set LIC indication.
     VS = VS + 1.

e -- Accept I-Frame.
     VR = VR + 1;
```

6.0 RTC Protocol Frames

The RTC protocol handles the transfer of data over the RF link. This protocol allows the basic sending data to and receive data from the terminals. In addition, functions to allow loopback of data, resetting the terminal protocol and version identification are implemented.

The protocol uses an asynch, 4800 bps, no parity and 1 stop bit encoding scheme that is frequency modulated (FM) over the radio link.

The RTC protocol uses a slotted polling technique instead of a sequence poll. Using this technique, the MUX will find out who has data available to send to the MUX and if a terminal can communicate with the MUX before a data frame is sent to it. Using a slotted poll has several advantages. The first one is a quicker detection of a terminal that have data to send and reductions in the number of idle poll cycles. The second advantage is that the MUX will not try to communicate with a terminal unless the terminal can communicate with the MUX. The last is that terminals may be added to the network dynamically without host intervention.

6.1 RTC Frame

The protocol uses the following frame format:

<stx> <addr> <command> <data> <etx> <crc-16> where   <stx>       -- hex value 02H which indicates the start of frame
        <addr>      -- address of the terminal communicating FFH is a broadcast message the high order bit (80H) is always set.

```
<command>       -- RTC command field (see section 6.2)
<data>          -- optional data field with length from 0 to
                   256 bytes. only 128 bytes are true data
                   bytes transparency is maintained by
                   replacing all stx (02H), etx (03H), and
                   dle (10H) bytes with the combination of
                   dle-<cbyte> where the <cbyte> is the
                   original byte with the high-order bit set
                   (80H).
<etx>           -- hex value 03H which indicates the end of a
                   frame
<crc-16>        -- CRC-16 check value which is calculated
                   from <addr> up to and including the <etx>
                   field all frames with invalid CRC are
                   ignore and the proper action for the
                   terminal is to set up to receive again.
```

6.2 RTC Commands

RTC command is designated by the lower 4 bits of the <command> field. The high order bit of the command field (80H) is always set. The other three bits are optional set depending on the command.

The following is the value of the different commands:

```
UP        0FH         Section 6.2.1
POLL0     00H         Section 6.2.2
POLL1     01H         Section 6.2.2
RESET     02H         Section 6.2.3
DATA      03H         Section 6.2.4
TEST      04H         Section 6.2.5
VERSION   05H         Section 6.2.6
```

6.2.1 UNNUMBERED POLL (UP) FRAME

UP is used by the mux to identify all terminals that require service.

The frame format for UP is
    <FFH>< UP ><#slots><optional addresses> where the fields are as follows:
    UP      command for unnumbered poll (FFH)
    #slots  number of slots for terminals to contend
            for. When terminals receive a UP and
            wish to reply to the UP, then they will
            pick a random number from 0 to #slots-1
            to response in the slot's time period.

optional addresses
            when the mux has data to send to the terminal
            it will put the terminal's address in this list
            with the high order bit set. The terminal will
            then response to the UP if it is able for data
            from the mux.

If the response to an UP results in all the slots having collisions and no valid UP, then another UP will be sent with a larger number of slots. If the mux continues to detect the above condition then it will keep sending UP with larger number of slots until a upper bound is met. Once this level is reached then the mux will individually poll each device that has come active.

The length of a terminal slot is 40 ms for the RC2250.

6.2.2 POLL0 (00H) and POLL1 (01H) FRAMES

The POLLx frames are used for three purposes:

1) The MUX uses the POLLx frames to actively poll an individual terminal for data.

2) Both the MUX and the terminal uses the POLLx frames to acknowledge receipt of a DATA frame.

3) The terminal will send this if it has nothing to send to a POLLx command from the MUX.

When the MUX detects a terminal RESET command, both the terminal and MUX logical control for that terminal will be set to be sending POLL0 frames. Upon receipt DATA frame from the communicating partner, the device will starting using POLL1. This flip-flopping will continue for each valid data frame received by a device.

The NO DATA bit (10H) in the POLLx command field is used by the MUX to poll a specific device to see if it is out there and wishes to not receive data at this time. This will occur when the MUX has tried to send a DATA frame to the terminal and no valid response was received. The MUX will poll again to see if the terminal has received the frame.

6.2.3 DATA FRAME

The DATA frame is used to transfer data from the MUX to the terminal and vice-versa. When sent by the MUX, a DATA frame can be sent at anytime. The terminal can send a DATA frame only in response to a POLLx with the NO DATA bit not set from the MUX.

If the receiving device accepts a valid DATA frame (no errors), then it is required to respond with the next POLLx frame. If a device received a POLLx frame in response to a DATA frame, the DATA frame is assumed to have been sent correctly.

The DATA frame has two special bits in the command field to give it the ability to send messages longer than 128 bytes of data. The FIRST IN CHAIN bit (FIC - 10H) indicates that this message is the first block in a chain of blocks. The LAST IN CHAIN bit (LIC - 20H) indicates that this block is the last block in a chain of blocks. Setting both FIC and LIC means this is the only block in the chain (OIC). Both FIC and LIC being cleared indicates that this block is the middle block of a chain (MIC) and that more is coming. A chain of blocks must be concatenated together to form a single block before processing on the data can begin at the receiving device.

6.2.4 RESET FRAME

The RESET frame is used to get the MUX and terminal into sync. The RESET command is sent to indicate that one unit is out of sync with the other device. This frame sequence can be forced by the HOST.

The MUX will send a RESET command if the host requests it, an invalid POLLx frame is received, if the terminal is not recognized by the MUX yet, or the terminal has sent a RESET frame to it. The MUX will keep sending the RESET frame to the terminal until a valid RESET frame is received from the terminal in response.

The terminal will send a RESET frame to the first valid non-broadcast frame on power up, upon receipt of an invalid POLLx frame and in response to a RESET frame from the MUX. Once the terminal enters a state where it needs to send a RESET frame, it will respond to a UP frame as having data to send and keep sending a RESET frame to any valid non-broadcast frame that is sent to it until the terminal receives and responds to valid MUX RESET frame.

The RESET frame also contains one of data. This is a identifier of what kind of device is sending the RESET frame. Hence the format of the RESET frame will be as follows:

<stx><addr><reset command><terminal type><etx><crc-16> where terminal type have the following values:

| Device | Data Stream | Terminal Type |
|--------|-------------|---------------|
| 2250   |             | 80D           |
| PCMUX  |             | 81D           |
| 1210E  | 3270        | 11D           |
| 2210   | Native      | 20D           |
| 2210   | 3270        | 21D           |
| 3210   | Native      | 30D           |
| 3210   | 3210        | 31D           |
| 3210   | Extended    | 32D           |
| 4210   |             | 40D           |

6.2.5 TEST FRAME

The TEST is initiated by the MUX device. This causes the terminal to respond with the identical TEST frame if has just receive. The data field of the TEST frame can be form 0 to 128 bytes of true data.

6.2.6 VERSION FRAME

The MUX sends this frame to enquire the terminal about the version of software this terminal is running. The terminal answer immediately with a VERSION frame with the data indicating the proper version information up to 128 bytes in length.

7.0 Data Link Exchange Examples

This section contains examples of RTC protocol flows on the rf link. The format of the examples is that the mux (primary) is on the left and the terminal (secondary) is on the right. An arrow shows the direction of data flow. Before thestarting point of an arrow is a description of the message. A message is one of the following:

UP(*,#slots,address)
    UP(address)
    ACK/POLL0(address)
    ACK/POLL1(address)
    NPOLL0(address)
    NPOLL1(address)

```
          RESET(address)
          DATA(address,chain)
```

7.1 MUX-Terminal Establishment

```
UP(*,3)              ------>
                              slot 0 empty
                     <------ UP(A)
                     <------ UP(B)
RESET(A)             ------>
                     <------ RESET(A)          A is now known
RESET(B)             ------>
                     <------ RESET(B)          B is now known
UP(*,3)              ------>                   primary checks for activity
                              slot 0 empty
                              slot 1 empty
                     <------ UP(C)             C identifies itself
RESET(C)             ------>
                     <------ RESET(C)          C is now known
```

7.2 DATA Frame Exchange

```
UP(*,3)              ------>                   mux checks if any terminal
                                               has data
                              slot0 empty
                     <------ UP(A)             A and B have data
                     <------ UP(B)
POLL0(A)             ------>                   mux specific poll of A
                     <------ DATA(A,OIC)
POLL1(A)             ------>                   mux acknowledges frame
                     <------ ACK0(A)           A is done
POLL0(B)             ------>                   mux specific poll of B
                     <------ DATA(B,OIC)
POLL1(B)             ------>
                     <------ ACK0(B)
UP(*,3,B)            ------>                   mux has data for B
                              UP(B)            B detects UP and sends
                                               response
                              slot1 empty
                              slot2 empty
DATA(B,FIC)          ------>                   mux send first data packet
                     <------ ACK1(B)           B acks the data
DATA(B,MIC)          ------>                   mux send second packet
                     <------ ACK0(B)           B acks the data
mux sends MIC data
packets until last
packet needs to be
sent.
                     <------ ACK0(B)           B acks the data
DATA(B,LIC)          ------>                   mux send last data packet
                     <------ ACK1(B)           B acks the data
UP(*,3)              ------>                   mux checks if any terminal
                                               has data
                              slot0 empty
                              slot1 empty
                              slot2 empty
```

7.3 CRC/Timeout Errors

CRC errors and timeout errors are treated the same by the mux and terminal.

```
UP(*,3,B)            ------>                   mux has data for B
```

|  |  |  |
|---|---|---|
|  | UP(B)<br>      slot1 empty<br>      slot2 empty | B detects UP and sends response |
| DATA(B,FIC) | ------> | mux send first data packet |
|  | <------ ACK1(B) | B acks the data |
| DATA(B,MIC) | ------> | B receives data with a CRC error and ignores packet |
| NPOLL0(B) | ------> | mux timeouts and polls B to find out if B has received the packet or not. |
|  | <------ ACK1(B) | B informs mux it didn't receive the packet. |
| DATA(B,MIC) | ------> | send second packet again. |
|  | <------ ACK0(B) | B acks the data. |
| DATA(B,LIC) | ------> | mux send last packet to B |
|  | <------ ACK1(B) | B acks data but packet is received by the mux with a crc error. |
| NPOLL0(B) | ------> | mux timeouts and polls B to find out if B has received the packet or not. |
|  | <------ ACK0(B) | B informs mux it has receive the packet. |
| UP(*,3) | ------> | mux checks if any terminal has data |
|  |       slot0 empty<br>      slot1 empty<br>      slot2 empty |  |

CERTIFICATE OF MAILING          Attorney Docket No. 6625-X
LABEL NO. B80170710

APPENDIX B
EXEMPLARY PROGRAM LISTING (The program shown on the following pages would be compiled using AZTEC C Compiler, Version 4.10C, and assembled by means of MICROSOFT 8086 Assembler, MASM, Version 5.1. A preferred operating system for the type 80186 processor of processor means 7-11, FIG. 7, is shown by a publication copyright 1984 by Hunter & Ready, Inc., 445 Sherman Avenue, Palo Alto, CA94306-0803, entitled VRTX/86, Versatile Real-Time Executive for the iAPX86 Family, USER'S GUIDE, Version 3, Document Number 591113003, July 1985.)

```
/*
    rtcext.h
    author Marvin Sojka purpose:
        extern Declarations for global identies used in the RTC protocol
*/ extern void (*rtc_timer_routine)();
extern rcb rcbs[128];
```

```
extern mux_stat stat;
extern unsigned up_q[128];
extern unsigned up_q_count;
extern unsigned up_flag;
extern unsigned up_inactive_count;
extern unsigned squelch;
extern unsigned squelch_check;
extern unsigned rtc_min_slots;
extern unsigned rtc_max_slots;
extern unsigned rtc_slots;
extern unsigned rtc_counts;

extern rcb_ptr crcb;
extern buff_ptr buff_temp;

extern unsigned char *rtc_txptr;
extern unsigned char *rtc_rxptr;
extern unsigned char *rtc_rxptr1;

extern unsigned char rtc_tx_buffer[1024];
extern unsigned char rtc_rx_buffer[1024];

extern unsigned rtc_tx_length;
extern unsigned rtc_rx_length;
extern unsigned rtc_rx_length1;

extern unsigned rtc_rx_state;
extern unsigned rtc_tx_state;

extern unsigned rtc_timer;
extern unsigned rtc_inact_timeout;

extern unsigned rtc_block_delay;
extern unsigned rtc_gap_delay;
extern unsigned rtc_up_delay;
extern unsigned rtc_ptt_delay;

extern unsigned rtc_callsign_timer;
extern unsigned char rtc_callsign[128];

extern unsigned long mailbox;
extern unsigned command_port;
extern unsigned data_port;
extern unsigned vector;
extern unsigned baud;
extern unsigned scc_reset;
extern unsigned port;
extern comm_port comm_ports[2];

extern unsigned kmart;
extern unsigned sna;
extern unsigned data_packet_size;
extern unsigned total_size;
extern unsigned rtc_in_q;
extern unsigned rtc_out_q;
extern unsigned max_terminals;
extern unsigned max_in;

extern unsigned b9600;
extern unsigned dual_enabled;
extern unsigned dual_turn;

extern unsigned debug;
                              void *sc_accept(void *);
void *sc_gblock(unsigned);
int  sc_getc();
void    sc_putc(unsigned);
void *sc_qpend(unsigned,unsigned long);
int sc_qpost(void *,unsigned);
```

```
int sc_rblock(unsigned,void  *);
long sc_gtime();
void    sc_stime(long);
int sc_pcreate(unsigned,unsigned,unsigned,void  *);
void *sc_pend(long,void  *);
int sc_pextend(unsigned,unsigned,void  *);
int     sc_post(void  *,void  *);
void *sc_qaccept(unsigned);
int     sc_qcreate(unsigned,unsigned);
void *sc_qinquiry(unsigned,unsigned  *);
int sc_tcreate(unsigned,unsigned, void  *());
int sc_tdelete(unsigned,unsigned);
void sc_tdelay(long);
void *sc_tinquiry(unsigned,void  *,void  *,void  *);
int sc_tpriority(unsigned,unsigned);
void sc_tresume(char,char);
void sc_tslice(unsigned);
int sc_tsuspend(char,char);
int sc_waitc(char);
void sc_lock();
void sc_unlock();
        SUBTTL SCC_EQUATES
        PAGE ;       interrupt controller constants
;       for non specific end of interrupt
INTERNAL_PORT_BASE  equ 0FF00H
EOI_REG             equ INTERNAL_PORT_BASE+22H
EOI                 equ 8000H                       ;non-specific end-of-interrupt VRTX            equ     20H
UI_ENTER        equ     16H
UI_EXIT         equ     11H EOI_8259_REG        equ 0fa00h
EOI_8259            equ 020h                        ;non-specific end-of-interrupt ;
;
;   SCC_EQUATES
;
;register 0 ("command register")
IUS                 equ 038H                ;reset highest Interrupt Under Service
RESET_ERROR         equ 030H
RESET_STATUS        equ 010H
RESET_TX_CRC        equ 080H
RESET_RX_CRC        equ 040H
RESET_RX            equ 070H
RESET_TX_UNDERRUN   equ 0C0H
RESET_TX_PENDING    equ 028H
;
ABORT_ON_UNDERRUN   equ 0A4H
FCS_ON_UNDERRUN     equ 0A0H ;register 1 (interrupt control)
TX_INTS             equ 00000010b   ;enable tx ints
EXT_TX_INTS         equ 00000011b   ;enable tx, ext stat ints
EXT_INTS            equ 00000001b   ;enable ext stat ints
RX_INTS             equ 00010100b   ;enable rx ints
NO_INTS             equ 00000000b   ;set  dma bits ;register 5 (tx control)
TX_ON               equ 0EAH
TX_OFF              equ 0E0H
PTT                                 equ 0E2H ;register 3 (rx control)
RX_ON               equ 0C1H
RX_OFF              equ 0C0H
```

```
;register 9
RESETA                          equ 089H
RESETB                          equ 049H ;register 10
CRCPRESET1                      equ 080H
NRZI                            equ 020H
NRZ                                             equ 000H ;register 11
CLOCK                           equ 078H
CLOCK1                          equ 008H
CLOCK2                          equ 052H ;register 14
SNRZI                           equ 0e0H
BRGEN                           equ 080H
DDPLL                           equ 060H
SEARCH                          equ 020H
BRENABLE                        equ 003H ;register 15 (external/status interrupt control)
TX_UND_INT      equ 040H        ;enable tx underrun interrupt
CD_INT          equ 008H        ;enable CD status interrupt
CTS_INT         equ 020H        ;enable CTS status interrupt
ABORT_INT       equ 080H        ;enable ABORT status interrupt ;read reg 0 meanings
DCD             equ 08h
CTS             equ 20h
ABORT           equ 80h
UNDERRUN        equ 40h
TX_EMPTY                        equ     04H ;read register 1 test masks
EOFRAME         equ 80h
CRCFRMERR       equ 40h
RXOVERRUN       equ 20h
PARERR          equ 10h ;protocol parameters
SDLC_MODE                       equ 020H
ASYNC_MODE                      equ 044H
SDLC_FLAG                       equ 07EH
;
    SUBTTL MACROS
    PAGE
; read_reg
;   read from a specified scc register. the port address is optionally
;   specified, so that you don't have to reload dx unless you need to.
;   Also, reads from port 0 don't generate a spurious write to set up the
;   register
;
read_reg    macro   regnum,portnum  ;19;39;54
ifnb    <portnum>   ;if a port address is specified
    mov dx,portnum              ;16;  ; ;16;
endif
if 0 ne regnum
    mov al,regnum               ; 4;  ; 4;20;
    out dx,al                   ; 9;  ;13;29;
    nop                         ; 3;  ;16;32;
    nop                         ; 3;  ;19;35;
    nop                         ; 3;  ;22;38;
    nop                         ; 3;  ;16;32;
    nop                         ; 3;  ;19;35;
    nop                         ; 3;  ;22;38;
endif
    in  al,dx                   ; 8; 8;30;46;
    nop                         ; 3;12;33;49;
```

```
        nop                               ; 3;15;36;51;
        nop                               ; 3;19;39;54;
        nop                               ; 3; ;16;32;
        nop                               ; 3; ;19;35;
        nop                               ; 3; ;22;38;
endm ; write_reg
;     opposite of read_read. same notes as above apply.
;
write_reg  macro   regnum,val,portnum  ;20;40;52;
ifnb    <portnum>     ;if a port address is specified
        mov dx,portnum                    ;12;  ; ;12;
endif
if 0 ne regnum
        mov al,regnum                     ; 4;  ; 4;16;
        out dx,al                         ; 7;  ;11;23;
        nop                               ; 3;  ;14;26;
        nop                               ; 3;  ;17;29;
        nop                               ; 3;  ;20;32;
        nop                               ; 3; ;16;32;
        nop                               ; 3; ;19;35;
        nop                               ; 3; ;22;38;
endif
        mov al,val                        ; 4; 4;24;36;
        out dx,al                         ; 7;11;31;43;
        nop                               ; 3;14;34;46;
        nop                               ; 3;17;37;49;
        nop                               ; 3;20;40;52;
        nop                               ; 3; ;16;32;
        nop                               ; 3; ;19;35;
        nop                               ; 3; ;22;38;
endm PAGE
;
;
; signal_eoi                     ;rel 062287
;    resets scc interrupt and interrupt controllers
;
signal_eoi  macro                         ;126;

;   reset the status and error state of the scc
        write_reg   0,IUS,command_port    ;32;32;
        write_reg   0,RESET_ERROR         ;20;52;
;
;   reset the 80188 internal interrupt controller
        mov     dx,EOI_REG                ;16;103;
        mov     ax,EOI                    ;12;115;
        out     dx,ax                     ;11;126;

endm

;**********************************************************************
;    THESE EQUATES THE 'ASCII' CONTROL CHARACTERS
;**********************************************************************
STX                     EQU     02H         ;START OF TEXT
ETX                     EQU     03H         ;END OF TEXT
/*
        rf.h -- header file for the rtc master protocol for the rt3210
        author -- Marvin Sojka
*/
#ifndef NULL
#define NULL ((void *)0)
endif define MAX_LENGTH    1025 typedef struct
{
```

```c
        unsigned timeouts;
        unsigned crc_errors;
        unsigned blocks_recv;
        unsigned blocks_sent;
        unsigned resets;
        long     bytes_recv;
        long     bytes_sent;
} term_stat,*term_stat_ptr;

typedef struct
{
        unsigned up_count[16];
        unsigned up_collisions[16];
        unsigned up_responses[16];
        unsigned up_max;
        unsigned timeouts;
        unsigned crc_errors;
        unsigned blocks_recv;
        unsigned blocks_sent;
        unsigned resets;
        long bytes_recv;
        long bytes_sent;
} mux_stat,*mux_stat_ptr;

typedef struct RCB
{
        unsigned free;
        unsigned address;
        unsigned vr;
        unsigned vs;
        unsigned state;
        buff_ptr txq;
        buff_ptr rxq;
        unsigned rx_length;
        unsigned inact_timer;
        unsigned char display;
        unsigned type;
        term_stat stat;
} rcb,*rcb_ptr;

#define RF_DATA                 0
#define RF_TEST         1
#define RF_VERSION      2
#define RF_ENABLE               3
#define RF_DISABLE              4
#define RF_REBOOT       5
#define RF_RESET                6
#define RF_RESETED              7
#define RF_DONE         8
#define RF_INACT                10
#define RF_CONFIG               11
#define RF_MSTAT                12
#define RF_GO                   13
#define RF_HALT                 14
#define RF_CCS                  15
#define RF_SLOTS                16
#define RF_PORT                 17
#define RF_SPEED                18
#define RF_STAT                 19
#define RF_STAT_RESET   20
#define RF_TIMEOUTS             21
#define RF_DEBUG                22
#define RF_MUX                  -1

/* RTC Frame Values */ define    POLL0                        0
define    POLL1                        1
#define    RESET                        2
```

```
#define     DATA                                    3
#define     TEST                                    4
#define     VERSION                                 5
define     UP                                      0xFF define     NPOLL                       0x10
define     STX                 0x02 /* start of text */
#define     ETX                                     0x03 /* end   of text */
#define     DLE                                     0x10

/*
    Transport Layer Values
*/
#define     FIC                 0x10
#define     MIC                 0x00
#define     LIC                 0x20
#define     OIC                 0x30

/* RTC event units */
#define IDLE0_EVENT     0x00
#define IDLE1_EVENT     0x01
#define IDLE2_EVENT     0x02
#define IDLE3_EVENT     0x03
#define IDLE4_EVENT     0x04
#define TIMEOUT_EVENT   0x05
#define RESET_EVENT     0x06
#define TEST_EVENT              0x07
#define VERSION_EVENT   0x08
#define ACK0_EVLNT          0x09
#define ACK1_EVENT      0x0A
#define ACK2_EVENT      0x0B
#define ACKN0_EVENT     0x0C
#define ACKN1_EVENT     0x0D
#define ACKN2_EVENT     0x0E
define D0_EVENT                0x0F define D1_EVENT                0x10
define D2_EVENT                0x11
define TERROR_EVENT    0x12 define REBOOT_COLD         0x00
define REBOOT_OS           0x01
define REBOOT_WARM         0x02 define RESET_COLD          0x00
define RESET_OS            0x10
#define RESET_WARM          0x20

/* states of the rts state machines */ define RESET_STATE 0x00
define NORM_STATE 0x01
#define RSP_STATE 0x02
#define TEST_STATE 0x03
define VERSION_STATE 0x04 define NOT_DONE        0x00
define DONE            0x01
#define RESET_CODE          0x02
#define CONNECT_CODE    0x03

/* error codes */
#define PERROR          -1
#define SERROR          -2
#define RESET_RCV       -3
#define BOERROR         -4
#define TERROR      -5
#define ACKERROR        -6
```

```c
#define DEFAULT_PTT_DELAY    15
#define DEFAULT_UP_DELAY     25
#define DEFAULT_GAP_DELAY    5
#define DEFAULT_BLOCK_DELAY  DEFAULT_GAP_DELAY+DEFAULT_PTT_DELAY
define MAX_NULL_UP 5 typedef struct
{
        unsigned char min_slots;
        unsigned char max_slots;
        unsigned char slots;
} slotx,*slot_ptr;

typedef struct
{
        unsigned char block;
        unsigned char gap;
        unsigned char ptt;
        unsigned char up;
} timeoutx,*timeout_ptr;

#define BAUD4800 0x16
define BAUD9600 0x0a typedef struct
{
    unsigned command_port;
    unsigned data_port;
    unsigned vector;
        unsigned port;
        unsigned baud;
        unsigned scc_reset;
} comm_port,comm_port_ptr;

#define OVERHEAD 4
#define BSIZE 128
typedef struct BUFFER
{
        struct BUFFER far *next;
        unsigned chain_status;
        unsigned type;
        unsigned length;
        unsigned address;
        unsigned char data[BSIZE+OVERHEAD];
} buffer;

typedef buffer far *buff_ptr;

#define BUFF_Q 6
#define BUFF_Q_ENTRIES 200
```

SUBTTL SEGMENT DEFINITIONS, DATA STRUCTURES
;DATA    segment public 'DATA'
    extrn command_port:word
    extrn data_port:word
    extrn rtc_txptr:word
    extrn rtc_rxptr:word
    extrn rtc_rxptr1:word
    extrn rtc_tx_length:word
    extrn rtc_rx_length:word
    extrn rtc_rx_length1:word
    extrn rtc_tx_state:word
    extrn rtc_rx_state:word
;
        extrn rtc_event_timer:near
        extrn rtc_block_delay:word
        extrn rtc_gap_delay:word
        extrn rtc_rx_done:near
    extrn rtc_timer:word
;
        extrn squelch:word
        extrn squelch_check:word

```
        extrn up_flag:word
        extrn vector:byte
        extrn baud:byte
        extrn scc_reset:word
        extrn max_in:word
;
;       %II% %I% %G%
        TITLE MY_CS
        NAME  MY_CS
        .XLIST
            include rtcasm.h
            include rtcasmext.h
        .LIST
        SUBTTL  Equates
        .186
@CODE       segment para    public 'CODE'
DATA        segment para    public 'DATA'
DATA ends assume ds:DATA,cs:@CODE
            extrn _dsxval:word public ints_disable
ints_disable    proc
        cli
        ret
ints_disable    endp public ints_enable
ints_enable     proc
        sti
        ret
ints_enable     endp public my_cs
my_cs       proc
        mov     ax,cs
        ret
my_cs       endp public my_ds
my_ds       proc
        mov ax,ds
        ret
my_ds       endp public set_ds
set_ds      proc
;
;       obtain ds for use by isr
;
        mov             ax,ds
        mov             cs:_dsxval,ax
;
        ret
set_ds      endp public int_timer
int_timer proc
        push    ax
        push    dx
        push    ds
    mov     ds,cs:_dsxval
; signal non specific end of interrupt
        mov     dx,EOI_REG
        mov     ax,EOI
        out     dx,ax
        sti
;
        cmp             squelch_check,0
        je              squ_020
```

```
;
        mov             dx,command_port         ; check squelch
        cli
    in  al,dx
        sti
        test    al,20H
        jnz             squ_010
;
        inc             squelch
;
        cmp             squelch,10
        jne             squ_020
;
        mov             squelch,0FFFFH
        mov             squelch_check,0
        jmp             squ_020
;
squ_010:
        xor             ax,ax
        mov             squelch,ax
;
squ_020:
        cmp             rtc_timer,0
        je              timer_010
        dec             rtc_timer
        jnz             timer_010
;
        pop             ds
        pop             dx
        mov             ax,UI_ENTER
        int             VRTX
;
        pusha
        push    ds
        push    es
;
        sti
    mov ds,cs:_dsxval
        call    rtc_event_timer
;
        pop     es
        pop             ds
        popa
        mov             ax,UI_EXIT
        int             VRTX
;
timer_010:
        pop             ds
        pop             dx
        pop             ax
        iret
int_timer endp
@CODE ends
        end
                DATA segment para public 'DATA' public  morse_table
morse_table     label byte
                db      '-----' ;0
                db      '.----' ;1
                db      '..---' ;2
                db      '...--' ;3
                db      '....-' ;4
                db      '.....' ;5
                db      '-....' ;6
                db      '--...' ;7
                db      '---..' ;8
                db      '----.' ;9
                db      '     ' ;:
                db      '     ' ;;
                db      '     ' ;<
```

```
                    db      '     '  ;=
                    db      '     '  ;>
                    db      '     '  ;?
                    db      '     '  ;@
                    db      '.-   '  ;A
                    db      '-... '  ;B
                    db      '-.-. '  ;C
                    db      '--.  '  ;D
                    db      '.    '  ;E
                    db      '..-. '  ;F
                    db      '--.  '  ;G
                    db      '.... '  ;H
                    db      '..   '  ;I
                    db      '.----'  ;J
                    db      '-.-  '  ;K
                    db      '.-.. '  ;L
                    db      '--   '  ;M
                    db      '-.   '  ;N
                    db      '---  '  ;O
                    db      '.--. '  ;P
                    db      '--.- '  ;Q
                    db      '.-.  '  ;R
                    db      '...  '  ;S
                    db      '-    '  ;T
                    db      '..-  '  ;U
                    db      '...- '  ;V
                    db      '.--  '  ;W
                    db      '-..- '  ;X
                    db      '-.-- '  ;Y
                    db      '--.. '  ;Z
DATA ends
    END
;
;   rtc_scc.asm 1.0
;
            PAGE    80,132
            TITLE RTC SCC INTERFACE
            NAME    RTC
            SUBTTL  Equates and macros
            .186
            .XLIST
            include rtcasm.h
            include rtcasmext.h
            .LIST
@CODE       segment para    public 'CODE'
DATA        segment para    public 'DATA'
DATA ends assume ds:DATA,cs:@CODE
;
            public  rtc_init_scc
rtc_init_scc    proc
;
    push bp
    mov bp,sp
    pushf
        cli
;
;
;
            read_reg        0,command_port
            write_reg       9,scc_reset
;
;       wait for chip reset
;
    nop
    nop
    nop
    nop
    nop
```

```
;
        write_reg        4,ASYNC_MODE
        write_reg        1,NO_INTS
        write_reg        2,vector
        write_reg        3,RX_OFF
        write_reg        5,TX_OFF
        write_reg        11,CLOCK2
        write_reg        12,baud
        write_reg        13,baud+1
        write_reg        14,BRENABLE
        write_reg        15,0                    ; no external interrupts
;
        write_reg        0,RESET_ERROR
        write_reg        0,RESET_STATUS
        write_reg        0,RESET_STATUS
;
        write_reg        9,9
        popf
        mov     sp,bp
        pop     bp
        ret
;
rtc_init_scc    endp public  rtc_deinit_scc
rtc_deinit_scc  proc
        pushf
        push    ax
        push    dx
        cli read_reg         0,command_port
        write_reg        9,scc_reset
        nop
        nop
        nop
        nop
        nop
        nop
        nop
        nop
        nop
        write_reg        9,9 pop     dx
        pop     ax
        popf
        ret
rtc_deinit_scc  endp public  rtc_stop_scc
rtc_stop_scc    proc
        pushf
        cli
;
        write_reg        1,NO_INTS,command_port
        write_reg        3,RX_OFF
        write_reg        5,TX_OFF
;
        popf
        ret
rtc_stop_scc endp
        public ptt
ptt proc
        pushf
        cli
        write_reg 5,PTT,command_port
        popf
        ret
```

```
       ptt endp
            public check_squelch
check_squelch   proc near
                cli
                read_reg 0,command_port
                and             ax,20h
                sti
                ret
check_squelch endp
;++++++++++++++++++++++++++++++++++++++++++++++++++++++++++++++++++++
; procedure: sign_init
; purpose: to initialize the scc for transmit
;++++++++++++++++++++++++++++++++++++++++++++++++++++++++++++++++++++
            public sign_init
sign_init proc   near
;
            cli
                write_reg 5,TX_ON,command_port
;
            sti
            ret
sign_init endp
;
            public send_sign
send_sign       proc near
            push    bp
            mov             bp,sp
;
            mov dx,command_port
polled_loop:
            cli
            read_reg 0
            sti
            test al,TX_EMPTY
            jz polled_loop
;
            cli
            mov dx,data_port
            mov ax,33H
            out dx,al
            sti
;
            pop bp
            ret
send_sign       endp
      public clr_tx
clr_tx proc near
      cli
            write_reg 1,0,command_port
            write_reg 5,TX_OFF
            write_reg 0,RESET_ERROR      ; reset errors
            write_reg 0,RESET_STATUS     ; reset ext/status
            write_reg 0,RESET_STATUS     ; reset ext/status
;
            sti
      ret
clr_tx  endp
@CODE ends
            end
;
;    %M% %I% %G%
    TITLE RTC ISR HANDLER FOR 8530 (SCC)
    NAME  RTC_ISR
    comment @

RTC ISR

The RTC interrupt service routines handle the four types of interrupts
    the scc can generate: Transmit Buffer Empty, External/Status, Receive
    Buffer Empty, and Special Receive Interrupt.

Important Data Structures:
```

```
                data_port    -- i/o address of the data port on the 8530.
                command_port -- i/o address of the command port on the 8530.

rtc_txptr      -- address in current buffer to be outputted
                rtc_tx_length  -- length of data left to output rtc_rxptr      -- address to input data into
                rtc_rx_length  -- length received.

rtc_tx_state   -- current state of transmitting
                rtc_rx_state   -- current state of receiving
@
        .XLIST
        include rtcasm.h
            include rtcasmext.h
        .LIST
        .SALL
        SUBTTL  Equates
        .186
@CODE       segment para    public 'CODE'
DATA        segment para    public 'DATA'
DATA ends assume ds:DATA,cs:@CODE ;
        public  _dsxval
_dsxval     dw      ?
        page
    public rtc_tx_init
rtc_tx_init proc
;
    mov     rtc_tx_state,offset tx_state0
    mov     rtc_rx_state,offset rx_null
;
    pushf
    cli
;
    write_reg   5,TX_ON,command_port
    write_reg   3,RX_OFF
        write_reg   1,TX_INTS
    write_reg   0,RESET_ERROR
    write_reg   0,RESET_STATUS
    write_reg   0,RESET_STATUS
;
;   OUTPUT CHAR
;
    les     bx,dword ptr rtc_txptr
    mov     al,es:[bx]
    mov     dx,data_port
    out     dx,al
    inc     word ptr rtc_txptr
    dec     rtc_tx_length
;
    popf
    ret
rtc_tx_init endp
;
;
;
        public rtc_rx_init
rtc_rx_init proc
;
;       set up rf_rxptr here
;
        mov     ax,rtc_rxptr1
        mov rtc_rxptr,ax
        mov ax,rtc_rxptr1+2
        mov rtc_rxptr+2,ax
        xor ax,ax
        mov rtc_rx_length,ax
```

```
                mov     ax,      max_in
                mov     rtc_rx_length1,ax
;
                pushf
                cli
;
        write_reg    5,TX_OFF,command_port
        write_reg    3,RX_ON
        write_reg    1,RX_INTS
        write_reg    0,RESET_ERROR
        write_reg    0,RESET_STATUS
        write_reg    0,RESET_STATUS
;
        mov     dx,data_port
        in      al,dx                      ;al = data byte
;
        mov     rtc_tx_state,offset tx_null
        mov     rtc_rx_state,offset rx_state0
                mov     ax,rtc_block_delay
                mov     rtc_timer,ax
                popf
                ret
rtc_rx_init endp
;
;++++++++++++++++++++++++++++++++++++++++++++++++++++++++++++++++++++
;   routines: rtc_tx_isr
;   purpose: handling tx interrupts from the scc
;++++++++++++++++++++++++++++++++++++++++++++++++++++++++++++++++++++
        public rtc_tx_isr
rtc_tx_isr proc
        pusha
        push    ds
        push    es
;
        mov     ds,cs:_dsxval              ;set data segment
;
                jmp             rtc_tx_state
;
tx_state0:
;
        mov     dx,data_port
        les     di,dword ptr rtc_txptr     ;get xmit data buffer
        mov     al,es:[di]                 ;get character to send
        out     dx,al                      ;send out character
        inc     rtc_txptr                  ;bump pointer for next char
        dec     rtc_tx_length              ;dec the number of char left
;
        jne     tx_null
;
        mov     rtc_tx_state,offset tx_state1
;
tx_null:
        signal_eoi
;
        pop     es
        pop     ds
        popa
        iret
;
tx_state1:
        jmp             comm_done
rtc_tx_isr endp
;
;++++++++++++++++++++++++++++++++++++++++++++++++++++++++++++++++++++
;   routines: rtc_rx_isr
;   purpose: handling interrupts from the scc
;++++++++++++++++++++++++++++++++++++++++++++++++++++++++++++++++++++
        public rtc_rx_isr
rtc_rx_isr proc
        pusha
        push    ds
        push    es
```

```
;
        mov     ds,cs:_dsxval           ;set data segment
;
        mov     dx,data_port
        in      al,dx                   ;al = data byte
        jmp     rtc_rx_state
;
;       rx_state0
;               -- check for STX
;                       if STX found, place it in receive buffer and set
;
rx_state0:
        cmp     al,STX
        jne     rx_null
;
        mov     rtc_rx_state,offset rx_state1
        jmp     rtc_rx_save
;
;
;       rf_rx_state 1
;               -- check for STX
;                       if STX found, reset rx buffers and set state to
;               -- check for ETX
;                       if ETX found, place it in receive buffer and set
;               -- otherwise
;                       place data into receive buffer.
;
rx_state1:
        cmp     al,ETX
        je      rtc_rx_11
;
        cmp     al,STX
        je      rtc_rx_12
;
        jmp     rtc_rx_save
;
rtc_rx_11:
        mov     rtc_rx_state,offset rx_state2
        jmp     rtc_rx_save
;
rtc_rx_12:
;
        mov     bx,rtc_rxptr1
        mov     rtc_rxptr,bx
        mov     bx,rtc_rxptr1+2
        mov     rtc_rxptr+2,bx
        xor     bx,bx
        mov     rtc_rx_length,bx
;
        jmp     rtc_rx_save
;
rtc_rx_13:
        call    rtc_rx_init
        jmp     rx_null
;
;
;       rf_rx_state 2
;               save first crc character and set state to 3
;
rx_state2:
        mov     rtc_rx_state,offset rx_state3
        jmp     rtc_rx_save
;
rtc_rx_save:
        dec     rtc_rx_length1
        jz      rtc_rx_13
;
        inc     rtc_rx_length
        les     di,dword ptr rtc_rxptr
        inc     rtc_rxptr
        mov     byte ptr es:[di],al
```

```
;               cmp             up_flag,1
                je              rx_null
;
                mov             ax,rtc_gap_delay
                mov             rtc_timer,ax
rx_null:
        signal_eoi
;
                pop             es
                pop             ds
                popa
                iret
;
;
;
;       rf_rx_state 3
;               save last crc character and set state to rx_null and process inp
;
rx_state3:
;
                inc             rtc_rx_length
                les             di,dword ptr rtc_rxptr
                inc             rtc_rxptr
                mov             byte ptr es:[di],al
;
                mov             rtc_rx_state,offset rx_null
;
                cmp             up_flag,1
                je              rx_null
;
comm_done:
                mov             rtc_timer,0
                mov             rtc_tx_state,offset tx_null
                mov             rtc_rx_state,offset rx_null
;
        write_reg 1,NO_INTS,command_port
        write_reg 3,RX_OFF
        write_reg 5,TX_OFF
        write_reg 0,RESET_STATUS
        write_reg 0,RESET_ERROR
        signal_eoi
;
                pop             es
                pop             ds
                popa
;
                push            ax
                mov             ax,UI_ENTER
                int             VRTX
                pusha
                push    ds
                push    es
;
                sti
        mov     ds,cs:_dsxval           ;set data segment
;
                call    rtc_rx_done
;
                pop             es
                pop             ds
                popa
;
                mov             ax,UI_EXIT
                int             VRTX
rtc_rx_isr endp
;
;++++++++++++++++++++++++++++++++++++++++++++++++++++++++++++++++++++++++
;       routine: ext_isr
;       purpose: handle external status interrupt
;++++++++++++++++++++++++++++++++++++++++++++++++++++++++++++++++++++++++
        public rtc_ext_isr
rtc_ext_isr proc
```

```
            pusha
            push    ds
            push    es
;
    mov     ds,cs:_dsxval           ;set data segment
;
            read_reg 0,command_port
            write_reg 0,RESET_STATUS,command_port
            write_reg 0,RESET_ERROR,command_port
            signal_eoi
;
            pop             es
            pop             ds
            popa
            iret
rtc_ext_isr endp
;++++++++++++++++++++++++++++++++++++++++++++++++++++++++++++++++
;       routine: special_isr
;       purpose: handle errors on receiving
;++++++++++++++++++++++++++++++++++++++++++++++++++++++++++++++++
        public rtc_special_isr
rtc_special_isr proc
            pusha
        push    ds
        push    es
;
    mov     ds,cs:_dsxval           ;set data segment
;
            read_reg 1,command_port
            write_reg 0,RESET_STATUS,command_port
            write_reg 0,RESET_ERROR,command_port
;
            mov             dx,data_port
            in              al,dx
;
            signal_eoi
;
            pop             es
            pop             ds
            popa
            iret
;
rtc_special_isr endp @CODE ends
     end
#include <stdio.h>
#include "buffer.h"
#define NULL ((void *)0)

void *sc_qpend(unsigned,long);
/*
        module:   buffer.c author: Marvin Sojka history:

purpose: buffer mangement routines.
                        get_buffer().
                         release_buffer().
                         check_buffer().
*/

/*
        procdure: get_buffer author: Marvin Sojka
```

```
        history:

purpose: obtain a buffer ptr form the VRTX queue BUFF_Q.  If no buffers
                                are available the procedure will suspend until one is a
*/ buff_ptr get_buffer()
{
        buff_ptr tbuff;
        tbuff = sc_qpend(BUFF_Q,0L);
        tbuff->next = NULL;
        return(tbuff);
}

/*
        procdure: release_buffer author: Marvin Sojka history:

purpose: release a buffer ptr to the VRTX queue BUFF_Q.  If the buffers
                                is NULL it is not released.  Also a chain of buffers ca
                                be released.
*/
void release_buffer(k)
buff_ptr k;
{
        buff_ptr temp;
        while (k != NULL)
        {
                temp = k->next;
                k->next = NULL;
                sc_qpost(k,BUFF_Q);
                k = temp;
        }
}

/*
        procdure: check_buffer author: Marvin Sojka history:

purpose: returns the number of buffers available on the BUFF_Q queue.
*/
unsigned check_buffer()
{
        unsigned count;
        sc_qinquiry(BUFF_Q,&count);
        return(count);
}
static unsigned int crc_table[256] =
{
0x0000, 0xc0c1, 0xc181, 0x0140, 0xc301, 0x03c0, 0x0280, 0xc241,
0xc601, 0x06c0, 0x0780, 0xc741, 0x0500, 0xc5c1, 0xc481, 0x0440,
0xcc01, 0x0cc0, 0x0d80, 0xcd41, 0x0f00, 0xcfc1, 0xce81, 0x0e40,
0x0a00, 0xcac1, 0xcb81, 0x0b40, 0xc901, 0x09c0, 0x0880, 0xc841,
0xd801, 0x18c0, 0x1980, 0xd941, 0x1b00, 0xdbc1, 0xda81, 0x1a40,
0x1e00, 0xdec1, 0xdf81, 0x1f40, 0xdd01, 0x1dc0, 0x1c80, 0xdc41,
0x1400, 0xd4c1, 0xd581, 0x1540, 0xd701, 0x17c0, 0x1680, 0xd641,
0xd201, 0x12c0, 0x1380, 0xd341, 0x1100, 0xd1c1, 0xd081, 0x1040,
0xf001, 0x30c0, 0x3180, 0xf141, 0x3300, 0xf3c1, 0xf281, 0x3240,
0x3600, 0xf6c1, 0xf781, 0x3740, 0xf501, 0x35c0, 0x3480, 0xf441,
0x3c00, 0xfcc1, 0xfd81, 0x3d40, 0xff01, 0x3fc0, 0x3e80, 0xfe41,
```

```
0xfa01, 0x3ac0, 0x3b80, 0xfb41, 0x3900, 0xf9c1, 0xf881, 0x3840,
0x2800, 0xe8c1, 0xe981, 0x2940, 0xeb01, 0x2bc0, 0x2a80, 0xea41,
0xee01, 0x2ec0, 0x2f80, 0xef41, 0x2d00, 0xedc1, 0xec81, 0x2c40,
0xe401, 0x24c0, 0x2580, 0xe541, 0x2700, 0xe7c1, 0xe681, 0x2640,
0x2200, 0xe2c1, 0xe381, 0x2340, 0xe101, 0x21c0, 0x2080, 0xe041,
0xa001, 0x60c0, 0x6180, 0xa141, 0x6300, 0xa3c1, 0xa281, 0x6240,
0x6600, 0xa6c1, 0xa781, 0x6740, 0xa501, 0x65c0, 0x6480, 0xa441,
0x6c00, 0xacc1, 0xad81, 0x6d40, 0xaf01, 0x6fc0, 0x6e80, 0xae41,
0xaa01, 0x6ac0, 0x6b80, 0xab41, 0x6900, 0xa9c1, 0xa881, 0x6840,
0x7800, 0xb8c1, 0xb981, 0x7940, 0xbb01, 0x7bc0, 0x7a80, 0xba41,
0xbe01, 0x7ec0, 0x7f80, 0xbf41, 0x7d00, 0xbdc1, 0xbc81, 0x7c40,
0xb401, 0x74c0, 0x7580, 0xb541, 0x7700, 0xb7c1, 0xb681, 0x7640,
0x7200, 0xb2c1, 0xb381, 0x7340, 0xb101, 0x71c0, 0x7080, 0xb041,
0x5000, 0x90c1, 0x9181, 0x5140, 0x9301, 0x53c0, 0x5280, 0x9241,
0x9601, 0x56c0, 0x5780, 0x9741, 0x5500, 0x95c1, 0x9481, 0x5440,
0x9c01, 0x5cc0, 0x5d80, 0x9d41, 0x5f00, 0x9fc1, 0x9e81, 0x5e40,
0x5a00, 0x9ac1, 0x9b81, 0x5b40, 0x9901, 0x59c0, 0x5880, 0x9841,
0x8801, 0x48c0, 0x4980, 0x8941, 0x4b00, 0x8bc1, 0x8a81, 0x4a40,
0x4e00, 0x8ec1, 0x8f81, 0x4f40, 0x8d01, 0x4dc0, 0x4c80, 0x8c41,
0x4400, 0x84c1, 0x8581, 0x4540, 0x8701, 0x47c0, 0x4680, 0x8641,
0x8201, 0x42c0, 0x4380, 0x8341, 0x4100, 0x81c1, 0x8081, 0x4040
};
#include "buffer.h"
#include "rtc.h"
#include "rtcext.h"
/*
        module:   crc.c author: Marvin Sojka history:

purpose: crc calculation routines.
                calc_crc()
                    set_crc()
                    check_crc().
*/

/*
        procdure: calc_crc author: Marvin Sojka purpose: calculate crc-16 values for a string of data of given length.

paramters:
                    buff -- pointer to buffer array.
                    len  -- length to calculate the crc-16 value on.

returns:
                    crc-16 value.
*/
unsigned calc_crc(buff,len)
char *buff;
unsigned len;
{
        unsigned index,crc;
        crc = 0;
        while (len)
        {
                index = ((crc ^ (*buff & 0xff)) & 0x00ff);
                crc = ( (crc >> 8) & 0x00ff) ^ crc_table[index];
                len--;
                buff++;
        }
        return (crc);
}

/*
```

```
        procdure: set_crc author: Marvin Sojka purpose: uses calc_crc to insert the crc-16 value into the
                    rtc_tx_buffer.

paramters:
                    length  -- length to calculate the crc-16 value on.

returns:
                    nothing
*/
set_crc(length)
unsigned length;
{
        unsigned *xcrc;

xcrc = (unsigned *) &rtc_tx_buffer[length];
        *xcrc = calc_crc(&rtc_tx_buffer[1],length-1);
        rtc_tx_buffer[length+2] = 0;
        rtc_tx_buffer[length+3] = 0;
        rtc_tx_length = length + 4;
}

/*
        procdure: check_crc
        author: Marvin Sojka purpose: uses calc_crc to get the crc-16 value for the
                    current rtc_rx_buffer and check the value against the
                    value in the rtc_rx_buffer.

paramters:

returns:
                    0 -- if the crc-16 check fails
                    1 -- if the crc-16 check passes.
*/
check_crc()
{
        unsigned *xcrc;

xcrc = (unsigned *) &rtc_rx_buffer[rtc_rx_length-2];
        return (*xcrc ==
                    calc_crc(&rtc_rx_buffer[1],rtc_rx_length-3));
}
#include "buffer.h"
#include "rtc.h"
#include "rtcext.h"

/*
    module:   rtc_idle.c procedure: rtc_idle author: Marvin Sojka called by:
        rtc_main.
```

```
    calls:
        none.

history:

purpose: this routine is called the first thing after a up command
             for each device in the up_q.  This routine will handling
             setting the event that is ocurring from the idle state.

returns:
            IDLE0_EVENT -- nothing on crcb->txq queue.
            IDLE1_EVENT -- data on crcb->txq and LIC.
            IDLE2_EVENT -- data on crcb->txq and -LIC.
            IDLE3_EVENT -- test frame on crcb->txq
            IDLE4_EVENT -- version frame on crcb->txq.
            TIMEOUT_EVENT -- invalid data on crcb->txq.
*/ rtc_idle()
{
    unsigned event;

/* if no buffer then IDLE0_EVENT */
    if (crcb->txq == NULL)
          event = IDLE0_EVENT;
    else
    {
            /* check Type for IDLEX_EVENT Type */
        switch (crcb->txq->type)
        {
            case RF_DATA:
                            /* Check to see if Last in Chain */
                if (crcb->txq->chain_status & LIC)
                    event = IDLE1_EVENT;
                else
                    event = IDLE2_EVENT;
                break;

case RF_TEST:
                event = IDLE3_EVENT;
                break;

case RF_VERSION:
                event = IDLE4_EVENT;
                break;

default:
                event = TIMEOUT_EVENT;
                break;
        }
    }
    return(event);
}
#include "buffer.h"
#include "rtc.h"
#include "rtcext.h"
buff_ptr get_buffer();
unsigned check_buffer();
rcb_ptr rcb_alloc(unsigned);
/*
    module:  rtc_action.c author: Marvin Sojka history:

purpose: provide action routines for the rtcfsm.
```

```
                rtc_rcv_data().
                rtc_accept_data().
                rtc_rcv_test().
                rtc_rcv_version().
                rtc_reset().
                rtc_done().
*/

/*
    procdure: rtc_rcv_data author: Marvin Sojka called by:
        rtc_rx calls:
        none history:

purpose: This is routine handles the placement of data from
             the rtc_rx_buffer into a temporary buffer for used by
             the system.

returns: TERROR_EVENT if a chaining error is detected.
             D0_EVENT if no buffers are available.
             D1_EVENT if no length error has occurred.
             D2_EVENT if an length error has occurred.

*/
rtc_rcv_data()
{
    unsigned event,i,length,length1;
    unsigned char *data;
    unsigned char *xdata;

/* check for a chain error */
    if ((crcb->rxq == NULL) &&
        (!(rtc_rx_buffer[2] & FIC)))
            event = TERROR_EVENT;
    else if ((crcb->rxq != NULL) &&
        (rtc_rx_buffer[2] & FIC))
    event = TERROR_EVENT;

/* check for no buffers */
else if (check_buffer() == 0)
    event = D0_EVENT;

else
{
    /* lease a buffer and setup the parameters */
    buff_temp = get_buffer();
    buff_temp->chain_status = rtc_rx_buffer[2] & OIC;
    buff_temp->type = RF_DATA;
    buff_temp->address = crcb->address;

/* decrement length for overhead */
    rtc_rx_length -= 6;
    length = crcb->rx_length;
    length1 = 0;
    data = &buff_temp->data[0];
    xdata = &rtc_rx_buffer[3];

/* move data into buffer without DLE sequences */
    for (i=0;i<rtc_rx_length;i++)
    {
        /* if length is greater than MAX_LENGTH abort */
        if (length1 >= data_packet_size)
            break;
```

```
                    if (length > total_size)
                        break;
            if (*xdata == DLE)
            {
                xdata++;
                *data++ = (*xdata) & 0x7F;
                xdata++;
                i++;
            }
            else
                *data++ = *xdata++;
            length++;
            length1++;
        }

/* check for length error */
        if (i == rtc_rx_length)
        {
            event = D1_EVENT;
            buff_temp->length = length1;
        }
        else
        {
            release_buffer(buff_temp);
            event = D2_EVENT;
        }
    }
    return(event);
}
/*
    procdure: rtc_accept_data author: Marvin Sojka called by:
        rtc_norm_state calls:
        none history:

purpose: This is handles queuing data that was created by rtc_rcv_data to
            the rcb.  If buffer is LIC then the data is sent on.
*/
rtc_accept_data()
{
    buff_ptr temp1;

crcb->stat.blocks_recv++;
        crcb->stat.bytes_recv += buff_temp->length;
        stat.blocks_recv++;
        stat.bytes_recv += buff_temp->length;

crcb->rx_length += buff_temp->length;
    if (crcb->rxq == NULL)
        crcb->rxq=buff_temp;
    else
    {
        temp1 = crcb->rxq;
        while (temp1->next != NULL)
            temp1 = temp1->next;
        temp1->next = buff_temp;
    }
    buff_temp->next = NULL;

if (buff_temp->chain_status & LIC)
```

```
                {
                        rtc_data_indication(crcb->rxq);
                        crcb->rx_length = 0;
                        crcb->rxq = NULL;
                }
        }
        rtc_accept_special()
        {
                crcb->stat.blocks_recv++;
                crcb->stat.bytes_recv += buff_temp->length;
                stat.blocks_recv++;
                stat.bytes_recv += buff_temp->length;
                rtc_data_indication(buff_temp);
        }
        /*
           procdure: rtc_rcv_test author: Marvin Sojka created: 2/29/87 called by:
                rtc_rx calls:
                none history:

purpose: This is routine handles the input of a test frame from the
                    terminal.

returns: D0_EVENT if no buffers are available.
                    TEST_EVENT if no length error has occurred.
                    D2_EVENT if an length error has occurred.

*/
        rtc_rcv_test()
        {
            unsigned event,i,length;
            unsigned char *data;
            unsigned char *xdata;

/* check for buffer */
            if (check_buffer() == 0)
                event = D0_EVENT;
            else
            {
                        /* get buffer to stuff data into */
                buff_temp = get_buffer();
                buff_temp->chain_status = OIC;
                buff_temp->type = RF_TEST;
                buff_temp->address = crcb->address;
                rtc_rx_length -= 6;
                length = 0;
                data = &buff_temp->data[0];
                xdata = &rtc_rx_buffer[3];

/* move data */
                for (i=0;i<rtc_rx_length;i++)
                {
                    if (length >= data_packet_size)
                        break;

if (*xdata == DLE)
                    {
                        xdata++;
                        *data++ = (*xdata) & 0x7F;
                        xdata++;
                                        i++;
                    }
                    else
```

```
                *data++ = *xdata++;
            length++;
        }
                /* check for length error */
        if (i == rtc_rx_length)
            {
            event = TEST_EVENT;
            buff_temp->length = length;
            }
        else
         {
            release_buffer(buff_temp);
            event = D2_EVENT;
            }
        }
    return(event);
}
/*
    procdure: rtc_rcv_version author: Marvin Sojka called by:
        rtc_rx calls:
        none history:

purpose: This is routine handles the input of a version frame from the
             terminal.

returns: D0_EVENT if no buffers are available.
             VERSION_EVENT if no length error has occurred.
             D2_EVENT if an length error has occurred.

*/
rtc_rcv_version()
{
    unsigned event,i,length;
    unsigned char *data;
    unsigned char *xdata;

/* check for buffers available */
    if (check_buffer() == 0)
        event = D0_EVENT;
    else
    {
            /* get buffer to stuff data into */
        buff_temp = get_buffer();
        buff_temp->chain_status = OIC;
        buff_temp->type = RF_VERSION;
        buff_temp->address = crcb->address;
        rtc_rx_length -= 6;
        length = 0;
        data = &buff_temp->data[0];
        xdata = &rtc_rx_buffer[3];

/* move data */
        for (i=0;i<rtc_rx_length;i++)
        {
            if (length >= data_packet_size)
                break;
            if (*xdata == DLE)
            {
                xdata++;
                *data++ = (*xdata) & 0x7F;
```

```
                    xdata++;
                                        i++;
            }
            else
                *data++ = *xdata++;
            length++;
        }

/* check for length error */
        if (i == rtc_rx_length)
        {
            event = VERSION_EVENT;
            buff_temp->length = length;
        }
        else
        {
            release_buffer(buff_temp);
            event = D2_EVENT;
        }
    }
    return(event);
}

/*
    procdure: rtc_reset author: Marvin Sojka called by:
        rtc_main calls:
        rcb_free
        rcb_alloc history:

purpose: This is routine handles the reset of a rcb into a initial state.

*/
rtc_reset(crcb)
rcb_ptr crcb;
{
        crcb->stat.resets++;
        stat.resets++;

release_buffer(crcb->txq);
    release_buffer(crcb->rxq);
    crcb->state = RESET_STATE;
    crcb->vr = 0;
    crcb->vs = 0;
    crcb->txq = NULL;
    crcb->rxq = NULL;
    crcb->rx_length = 0;
}
/*
    procdure: rtc_done author: Marvin Sojka called by:
        rtc_main calls:
        rtc_rsp_state
        rtc_version_state
        rtc_test_state
```

```
    history:

purpose: This is routine handles the completion of a request from the
             host.  If type == 1 and sna option is not active then a
                         RF_DONE message is sent to the host.
*/
rtc_done(type)
{
    buff_ptr temp,temp1;

temp = crcb->txq;

crcb->stat.blocks_sent++;
    crcb->stat.bytes_sent += temp->length;
    stat.blocks_sent++;
    stat.bytes_sent += temp->length;

crcb->txq = crcb->txq->next;
    temp->next = NULL;
    if ((!sna) && (type))
    {
        temp->address = crcb->address;
        temp->chain_status = OIC;
        temp->type = RF_DONE;
if (debug)
        sc_printf("RTC_OUT %d,%d\n",temp->type,temp->address);

sc_qpost(temp,rtc_out_q);
    }
    else
        release_buffer(temp);
}
#include "buffer.h"
#include "rtc.h"
#include "rtcext.h"
/*
    module:   main.c author: Marvin Sojka history:

purpose: main startup routines. also initialization routine and
             inactivity timer routines.
             main().
             rtc_init().
             rtc_inact().
             rtc_check_inact().
*/ void rtc_tx_isr();
void rtc_rx_isr();
void rtc_ext_isr();
void rtc_special_isr();

void rtc_inact();
buff_ptr get_buffer();
buff_ptr sc_qpend();
void rtc_init();

/*
    procdure: main author: Marvin Sojka history:
```

```
    called by:
        startup calls:
        rcb_init
        set_ds
        rtc_main purpose: This is the main startup routine for rtc master.
             It displays the started message and initialize
             variables.  It also creates the
             inactivity timer task.  Last thing it does
             is set down the priority of the task and call rtc_loop,
             the main processing loop of rtc.

*/ main(argc,argv)
unsigned argc;
unsigned char *argv[];
{
        unsigned char *data;
        buff_ptr xbuff;
        unsigned i;
        unsigned char *k;

sc_printf("RTC MUX V1.23\n");

k = (unsigned char *) &stat;
        for (i=0;i<sizeof(mux_stat);i++)
                *k++ = 0;

squelch_check = 0;

mailbox = 0L;

rtc_gap_delay    = DEFAULT_GAP_DELAY;
        rtc_block_delay = DEFAULT_BLOCK_DELAY;
        rtc_up_delay    = DEFAULT_UP_DELAY;
        rtc_ptt_delay   = DEFAULT_PTT_DELAY;

#ifdef DEBUG
        debug = 1;
#else
        debug = 0;
endif rtc_timer = 0;
        up_inactive_count = 0;
    rtc_callsign_timer = 175;
        rtc_inact_timeout = 1200;

comm_ports[0].command_port              = 0x84;
comm_ports[0].data_port             = 0x86;
comm_ports[0].vector                = 0xE0;
        comm_ports[0].port                              = 1;
        comm_ports[0].baud                              = BAUD4800;
        comm_ports[0].scc_reset             = 0x89;
comm_ports[1].command_port          = 0x80;
comm_ports[1].data_port             = 0x82;
comm_ports[1].vector                = 0xE0;
        comm_ports[1].port                              = 0;
        comm_ports[1].baud                              = BAUD4800;
        comm_ports[1].scc_reset             = 0x49;
        b9600                               = 0;
        dual_enabled        = 0;
        dual_turn                           = 0;
        sna                                 = 0;
        kmart                               = 0;
        rtc_out_q                           = 22;
```

```
                rtc_in_q                        = 23;
                scc_reset                       = 0x89;
                max_terminals       = 128;
                data_packet_size    = 128;
                max_in                          = 266;
                total_size                      = 2049;
                rtc_min_slots       = 3;
                rtc_max_slots       = 15;
                rtc_slots                       = 3;
                rtc_counts                      = 5;
for (i=1;i<argc;i++)
{
        data = argv[i];
        if (*data++ != '-')
        {
                usage();
                exit();
        }
        switch (*data++)
        {
                case 'D':
                case 'd':
                        if ((*data == '1') ||
                            (*data == '2'))
                                comm_ports[(*data++) - '1'].data_port =
                        else
                        {
                                usage();
                                exit();
                        }
                        break;

case 'C':
                case 'c':

if ((*data == '1') ||
                            (*data == '2'))
                                comm_ports[(*data++) - '1'].command_port
                        else
                        {
                                usage();
                                exit();
                        }
                        break;

case 'I':
                case 'i':
                        if ((*data == '1') ||
                            (*data == '2'))
                                comm_ports[(*data++) - '1'].vector = ato
                        else
                        {
                                usage();
                                exit();
                        }
                        break;

case 'P':
                case 'p':
                        if ((*data == '1') ||
                            (*data == '2'))
                        {
                                i = (*data++) - '1';
                                if (*data == '0')
                                {
                                        comm_ports[i].scc_reset = 0x49;
                                        comm_ports[i].port = 0;
                                }
                                else if (*data == '1')
                                {
```

```
                                        comm_ports[i].scc_reset = 0x89;
                                        comm_ports[i].port = 1;
                                }
                                else
                                {
                                        usage();
                                        exit();
                                }
                        }
                        else
                        {
                                usage();
                                exit();
                        }
                        break;

case 'K':
                case 'k':
                        kmart = 1;
                        break;

case 'S':
                case 's':
                        sna = 1;
                        break;

case 'Q':
                case 'q':
                        rtc_out_q = atoi(data);
                        rtc_in_q = rtc_out_q+1;
                        break;

case 'X':
                case 'x':
                        data_packet_size = atoi(data);
                        max_in = (data_packet_size * 2) + 10;
                        break;

case 'T':
                case 't':
                        total_size = atoi(data);
                        break;

default:
                        usage();
                        exit();
                }
        } rcb_init();
set_ds();
rtc_timer_init();
sc_tcreate(0x30,newpid(),(far *) &rtc_inact);

sc_tpriority(0,0x03);

/* start the real processing */
rtc_main();
}
rtc_switch()
{ rtc_stop_scc();
        rtc_init(dual_turn);
        if (b960 )
        {
                if (comm_ports[dual_turn].baud == BAUD4800)
                        comm_ports[dual_turn].baud = BAUD9600;
                else
                        comm_ports[dual_turn].baud = BAUD4800;
        }
```

```
        if (dua  enabled)
             dual_turn = (dual_turn + 1) & 0x01;
}
/*
    procdure: r   _init author: Mar in Sojka called by:
        rtc_mai calls:
        set_ds
        rtc_timer_init
        rtc_init_scc history:

purpose: This is the routine provides the setup for both hardware and
             software.  It intialize the scc baud rate to 4800 bps.
*/ void rtc_init(index)
{
    unsigned *  mp;
    unsigned x   ;

/* set up global varibles for the scc */
        command_port = comm_ports[index].command_port;
        data_p  t = comm_ports[index].data_port;
        vector  = comm_ports[index].vector;
        port = comm_ports[index].port;
        baud = comm_ports[index].baud;
        scc_res t = comm_ports[index].scc_reset;

ints_disab  ();
    /* now set up interrupt vectors for the scc */
    xcs = my_c  ();
    temp = (un igned *) ((vector + (port * 8)) * 4);
    *temp++ =  unsigned)&rtc_tx_isr;
    *temp++ =    s;
    temp++;
    temp++;
    *temp++ = (u signed)&rtc_ext_isr;
    *temp++ = xc  ;
    temp++;
    temp++;
    *temp++ = (  signed)&rtc_rx_isr;
    *temp++ = x   ;
    temp++;
    temp++;
    *temp++ = (  signed)&rtc_special_isr;
    *temp++ =     ;
    ints_enabl  );

/* initiali   scc chip */
    rtc_init_sc ();

}

/*
    display_st   is purpose:
        display the status of a given terminal on the LCD paramter:
        num  -- position to display status on the LCD (0-31)
```

```c
       stat -- status to display
*/
display_status( num,stat )
unsigned char num;
char stat;
{
    lock_console(1);
    LCD_set_cursor(num);
    LCD_putc(stat);
    unlock_console();
}

/*
    procdure: rtc_inact author: Marvin Sojka called by:
        none (this is a task)

calls:
        none history:

purpose: This is the inactivity timer task.  It will awaken every
             10 seconds and decrement the rtc_callsign_timer.  It will check
             each valid rcb for an inactivity timeout.

*/
void rtc_inact()
{
    unsigned i;
    rcb_ptr qrcb;

for (;;)
    {
        sc_tdelay(1000L);
        if (rtc_callsign_timer != 0)
            rtc_callsign_timer--;
        for (i=0;i<max_terminals;i++)
        {
            qrcb = &rcbs[i];
            if ((qrcb->free == 1) &&
                (qrcb->inact_timer != 0) &&
                (qrcb->inact_timer != 0xFFFF))
                qrcb->inact_timer--;
        }
    }
}

/*
    procdure: rtc_check_inact author: Marvin Sojka called by:
        rtc_main calls:
        none history:

purpose: This procedure will check for a rcb that has gone inactive.  It
             has then a inactive message is sent to the main procdure.
```

```
*/
rtc_check_inact()
{
    unsigned i;
    rcb_ptr qrcb;
    buff_ptr qbuff;

for (i=0;i<max_terminals;i++)
    {
        qrcb = &rcbs[i];
        if ((qrcb->free == 1) &&
            (qrcb->inact_timer == 0))
        {
                        if (sna)
                                display_status(qrcb->address,'I');

qrcb->inact_timer = 0xFFFF;
            qbuff = get_buffer();
            qbuff->address = qrcb->address;
            qbuff->chain_status = OIC;
            qbuff->type = RF_INACT;
            qbuff->length = 0;
if (debug)
        sc_printf("RTC_OUT %d,%d\n",qbuff->type,qbuff->address);
            sc_qpost(qbuff,rtc_out_q);
        }
    }
} usage()
{ lock_console(1);
        sc_printf("RTC : run rtc [-dcikpqsx]\n");
        unlock_console();
}
#include <stdio.h>
#include "buffer.h"
#include "rtc.h"
#include "rtcext.h"
#include "vrtx.h"
/*
    module:   rtc_time.c author: Marvin Sojka history:

purpose: support routines for the 80186 timer used for ptt and character
             timeouts.

rtc_event_timer().
            rtc_timeout().
            rtc_timer_init().
*/ define PORTBASE           0xFF00
define TIMER2_CONTROL     PORTBASE+0x66
#define TIMER2_COUNTER     PORTBASE+0x62
#define TIMER2_INT         0x13
#define TIMER0_CONTROL     PORTBASE+0x56
#define TIMER0_COUNTER     PORTBASE+0x52
#define TIMER0_INT         0x8
#define INTERRUPT_STAT     PORTBASE+0x30
define TIMER_INT_CTL      PORTBASE+0x32 extern int_timer();
```

```
/*
    procdure: rtc_event_timer author: Marvin Sojka history:

called by:
        int_timer (asm routine)

calls:
        *rtc_event_timer()

purpose: This routine handles which routine need to be called on a
             rf_timer timeout.
*/
rtc_event_timer()
{
    (rtc_timer_routine)();
}

/*
    procdure: main
    author: Marvin Sojka history:

called by:
        rtc_event_timer calls:
        none.

purpose: Sends a TIMEOUT_EVENT message to mailbox when the
             rf_timer expires and rf_timer_routine is set to rtc_timeout.
*/
rtc_timeout()
{
    rtc_stop_scc();
    sc_post((void *)TIMEOUT_EVENT,&mailbox);
}

/*
    procdure: rtc_event_timer author: Marvin Sojka history:

called by:
        rtc_main calls:
        none purpose: This routine sets up the timer interrupt and the 80186 timer.
*/
rtc_timer_init()
{
    unsigned *temp;
```

```c
#include "buffer.h"
#include "rtc.h"
#include "rtcext.h"

set_lrchash( length )
unsigned length;
{
        unsigned i;
        unsigned lrc,hash;
        register unsigned char *x;

lrc = 0;
        hash = 0;
        x = &rtc_tx_buffer[1];
        for ( i=1; i<length; ++i )
        {
                lrc = lrc ^ *x;
                hash += *x;
                x++;
        }
        rtc_tx_buffer[length] = lrc;
        rtc_tx_buffer[length+1] = hash;
        rtc_tx_buffer[length+2] = 0;
        rtc_tx_buffer[length+2] = 0;
        rtc_tx_length = length + 4;
} check_lrchash()
{
    register unsigned char *data;
    unsigned i,lrc,hash;

/* check lrc/hash for the unit */
    lrc = 0;
    hash = 0;
        data = &rtc_rx_buffer[1];

for ( i=1; i<rtc_rx_length-2; i++ )
    {
        lrc = lrc ^ *data;
        hash += *data;
                data++;
    } if ( ((lrc & 0xFF) !=(rtc_rx_buffer[rtc_rx_length-2] & 0xFF)) ||
        ((hash & 0xFF)!=(rtc_rx_buffer[rtc_rx_length-1]& 0xFF)) )
                return(0);
        else
                return(1);
}
#include <stdio.h>
#include "buffer.h"
#include "rtc.h"
#include "rtcext.h"
#include "vrtx.h"

/*
    module:   rtc_in.c procedure: rtc_in author: Marvin Sojka called by:
        rtc_main.

calls:
```

```
            rcb_find
            rcb_free
            rcb_alloc history:

purpose: this routine is handles the data from the host to processed.

RF_RESET -- reset all active rcb and return a RF_RESETED command to host.
    RF_DATA  -- if a rcb with address is active then queue data until LIC
                to rcb otherwise release the data.

RF_REBOOT -- if reset a rcb into initial state and mark it for approate
                 reboot sequeunce.

RF_ENABLE -- enable a rcb with address passed.

RF_DISABLE -- deactivate a rcb with address passed.

RF_CONFIG  -- store configuration information away.

RF_MSTATS  -- find status of message for address passed.

RF_HALT    -- stop the RTC task until a RF_GO command is received.
                                    Only valid commands that can be sent at this t
                                    are RF_RESET and RF_GO.

RF_GO      -- starts RTC tasks after a RF_HALT has been received.

*/
rcb_ptr rcb_find(unsigned);
rcb_ptr rcb_alloc(unsigned);

rtc_in()
{
    buff_ptr qbuff,temp;
    rcb_ptr  qrcb;
        slot_ptr q;
        timeout_ptr t;
    unsigned i,j;
        unsigned char *k;

/* check if a buffer is available */
    while (qbuff = sc_qaccept(rtc_in_q))
    {
if (debug)
        sc_printf("RTC_IN %d,%d\n",qbuff->type,qbuff->address);

switch (qbuff->type)
        {

/* RF_RESET indicates that all terms are to be reseted
                       and a RF_RESETED command is sent to the upper layers
            case RF_RESET:
                            /* reset all active terminals */
                            for (i=0;i<max_terminals;i++)
                            {
                                    qrcb = &rcbs[i];
                                    if (qrcb->free == 1)
                                            rtc_reset(qrcb);
                            }

/* Send RF Reseted to Upper Layers */
                qbuff->type = RF_RESETED;
                qbuff->chain_status = OIC;
if (debug)
        sc_printf("RTC_OUT %d,%d\n",qbuff->type,qbuff->address);

sc_qpost(qbuff,rtc_out_q);
                break;
```

```
                /* RF_TEST, RF_VERSION, and RF_DATA are queue to the
                        terminals rcb if one is active
                */
                case RF_TEST:
case RF_DATA:
                case RF_VERSION:
                        /* Check to see if a rcb is active for this addr
        if ((qrcb = rcb_find(qbuff->address)) != NULL)
        {
                                        /* chain if NULL, easy just queue it */
                if (qrcb->txq == NULL)
                        qrcb->txq = qbuff;
                else
                {
                                                /* if used for SNA or KMART then
                                                        queue can have multiple
                                                        otherwise release the cu
                                                        send the next one
                                                */
                                                if ((sna) || (kmart))
                                                {
                                                        temp = qrcb->txq;
                                                        while (temp->next != NUL
                                                                temp = temp->nex
                                                        temp->next = qbuff;
                                                }
                                                else
                                                {
                                                        release_buffer(qrcb->txq
                                                        qrcb->txq = qbuff;
                                                }
                }
        }
        else
                                release_buffer(qbuff);
        break;

/*
                        RF_REBOOT resets the rcb
                */
case RF_REBOOT:
                if (qbuff->address != -1)
                {
                        if ((qrcb = rcb_find(qbuff->address)) !=
                                rtc_reset(qrcb);
                        else
                                qrcb = rcb_alloc(qbuff->address)
                }
                else
                {
                        /* reset all active terminals */
                        for (i=0;i<max_terminals;i++)
                        {
                                qrcb = &rcbs[i];
                                if (qrcb->free == 1)
                                        rtc_reset(qrcb);
                        }
                }
        release_buffer(qbuff);
        break;

/*
                        RF_ENABLE will allocate a rcb for a given addres
                        if one doesn't exist or resets the rcb if one al
                        does.
                */
case RF_ENABLE:
                if (qbuff->address != -1)
                {
                                if ((qrcb = rcb_find(qbuff->address)) ==
                                        qrcb = rcb_alloc(qbuff->address)
```

```
                                else
                                        rtc_reset(qrcb);
                }
                else
                {
                        for (i=0;i<qbuff->length;i++)
                        {
                                if ((qrcb = rcb_find(i)) == NULL
                                {
                                        if (qbuff->data[i])
                                                qrcb = rcb_alloc
                                }
                                else
                                {
                                        if (qbuff->data[i])
                                                rtc_reset(qrcb);
                                        else
                                        {
                                                sc_printf("DISAB
                                                rcb_free(qrcb);
                                        }
                                }
                        }
                }
                release_buffer(qbuff);
        break;
/*
                RF_DISABLE will take a rcb off the active list
        */
case RF_DISABLE:
        if ((qrcb = rcb_find(qbuff->address)) != NULL)
        {
                rcb_free(qrcb);
        }
        release_buffer(qbuff);
        break;

/*
                RF_MSTAT will find the state of a rcb txq
                */
case RF_MSTAT:
                if (qbuff->address != -1)
                {
                        i = 1;
                        if ((qrcb = rcb_find(qbuff->address)) !=
                        {
                                if (qrcb->txq)
                                {
                                        if (qrcb->inact_timer ==
                                                i = 4;
                                        else
                                                i = 3;
                                }
                                else
                                        i = 2;
                        }
                        qbuff->chain_status = OIC;
                        qbuff->length = 1;
                        qbuff->data[0] = i;
if (debug)
        sc_printf("RTC_OUT %d,%d\n",qbuff->type,qbuff->address);

if (qbuff->next != NULL)
                                sc_post(qbuff,qbuff->next);
                        else
                                sc_qpost(qbuff,rtc_out_q);
                }
                else
                {
                        for (j=0;j<max_terminals;j++)
                                qbuff->data[j] = 1;
```

```
                                for (j=0;j<max_terminals;j++)
                                {
                                        qrcb = &rcbs[j];
                                        if (qrcb->free == 1)
                                        {
                                                if (qrcb->txq)
                                                {
                                                        if (qrcb->inact_
                                                                i = 4;
                                                        else
                                                                i = 3;
                                                }
                                                else
                                                        i = 2;
                                                qbuff->data[qrcb->addres
                                        }
                                }
                                qbuff->chain_status = OIC;
                                qbuff->length = max_terminals;
if (debug)
        sc_printf("RTC_OUT %d,%d\n",qbuff->type,qbuff->address);

if (qbuff->next != NULL)
                                        sc_post(qbuff,qbuff->next);
                                else
                                        sc_qpost(qbuff,rtc_out_q);
                        }
                break;

/*
                                RF_HALT will stop the RTC task until a RF_GO
                                command is received.  Only valid commands
                                that can be sent at this time are RF_RESET and
                                RF_GO.
                        */
                        case RF_HALT:
                                i = 0;
                                release_buffer(qbuff);
                                while (!i)
                                {
                                        /* wait for buffer */
                                        qbuff = sc_qpend(rtc_in_q,0L);
if (debug)
        sc_printf("RTC_IN %d,%d\n",qbuff->type,qbuff->address);

/* if RF_RESET handle as above */
                                        if (qbuff->type == RF_RESET)
                                        {
                                                mailbox = 0L;
                                                rtc_timer = 0;
                                                /* stop SCC */
                                                rtc_init_scc();

/* reset all active terminals */
                                                for (i=0;i<max_terminals;i++)
                                                {
                                                        qrcb = &rcbs[i];
                                                        if (qrcb->free == 1)
                                                        {
                                                                j = qrcb->addres
                                                                rcb_free(qrcb);
                                                                rcb_alloc(j);
                                                        }
                                                }

/* send RF_RESETED to Host */
                                                qbuff->type = RF_RESETED;
                                                qbuff->chain_status = OIC;
if (debug)
        sc_printf("RTC_OUT %d,%d\n",qbuff->type,qbuff->address);
```

```
                                    sc_qpost(qbuff,rtc_out_q);
                            }
                            /* if RF_GO get out of this loop */
                            else if (qbuff->type == RF_GO)
                            {
                                    i = 1;
                                    release_buffer(qbuff);
                            }
                            /* release all other buffers */
                            else
                                    release_buffer(qbuff);
                    }
                    break;

case RF_CCS:
                    for (i=0;i<qbuff->length;i++)
                            rtc_callsign[i] = qbuff->data[i];
                    rtc_callsign[i] = '\0';
                    release_buffer(qbuff);
                    break;

case RF_SLOTS:
                    q = (slot_ptr) &qbuff->data[0];
                    rtc_min_slots = q->min_slots;
                    rtc_max_slots = q->max_slots;
                    rtc_slots = q->min_slots;
                    rtc_counts = q->slots;
                    release_buffer(qbuff);
                    break;

case RF_PORT:
                    dual_enabled = qbuff->data[0] & 0xFF;
                    if (dual_enabled == 0)
                            dual_turn = 0;
                    release_buffer(qbuff);
                    break;

case RF_SPEED:
                    b9600 = qbuff->data[0] & 0xFF;
                    if (b9600 == 0)
                    {
                            comm_ports[0].baud      = BAUD4800;
                            comm_ports[1].baud      = BAUD4800;
                    }
                    release_buffer(qbuff);
                    break;

case RF_STAT:
                    if (qbuff->address != -1)
                    {
                            if ((qrcb = rcb_find(qbuff->address)) !=
                            {
                                    k = (unsigned char *)&qrcb->stat
                                    for (i=0;i<sizeof(term_stat);i++
                                            qbuff->data[i] = *k++;
                                    qbuff->length = sizeof(term_stat
                                    qbuff->chain_status = OIC;
if (debug)
    sc_printf("RTC_OUT %d,%d\n",qbuff->type,qbuff->address);

sc_qpost(qbuff,rtc_out_q);
                            }
                            else
                                    release_buffer(qbuff);
                    }
                    else
                    {
                            k = (unsigned char *)&stat;
                            for (i=0;i<sizeof(mux_stat);i++)
                                    qbuff->data[i]= *k++;
                            qbuff->length = sizeof(mux_stat);
                            qbuff->chain_status = OIC;
```

```
            if (debug)
                    sc_printf("RTC_OUT %d,%d\n",qbuff->type,qbuff->address);
                                            sc_qpost(qbuff,rtc_out_q);
                                    }
                            break;
                            case RF_STAT_RESET:
                                    if (qbuff->address != -1)
                                    {
                                            if ((qrcb = rcb_find(qbuff->address)) !=
                                            {
                                                    k = (unsigned char *)&qrcb->stat
                                                    for (i=0;i<sizeof(term_stat);i++
                                                            *k++ = 0;
                                            }
                                    }
                                    else
                                    {
                                            k = (unsigned char *)&stat;
                                            for (i=0;i<sizeof(mux_stat);i++)
                                                    *k++ = 0;
                                            for (i=0;i<max_terminals;i++)
                                            {
                                                    qrcb = &rcbs[i];
                                                    if (qrcb->free == 1)
                                                    {
                                                            k = (unsigned char *)&qr
                                                            for (i=0;i<sizeof(term_s
                                                                    *k++ = 0;
                                                    }
                                            }
                                    }
                                    release_buffer(qbuff);
                                    break;

case RF_TIMEOUTS:
                                    t = (timeout_ptr) &qbuff->data[0];
                                    rtc_block_delay = t->block;
                                    rtc_gap_delay = t->gap;
                                    rtc_ptt_delay = t->ptt;
                                    rtc_up_delay = t->up;
                                    release_buffer(qbuff);
                                    break;
                            case RF_DEBUG:
                                    debug = qbuff->data[0];
                                    release_buffer(qbuff);
                                    break;

default:
                                    release_buffer(qbuff);
                                    break;
                    }
            }
}
#include "buffer.h"
#include "rtc.h"
#include "rtcext.h"

/*
    module:   rtc_rcb.c author: Marvin Sojka history:

purpose: handles initialize, allocating, freeing and finding rcb's.
            rcb_alloc
            rcb_free
```

```
            rcb_find
            rcb_init
*/

/*
    procdure: rtc_alloc author: Marvin Sojka created:

called by:
        rtc_main
        rtc_in
        rtc_reset calls:
        none history:

purpose: This is allocs a rcb with the address passed.  If no rcb is
             available then a NULL is returned.

*/
rcb_ptr rcb_alloc(address)
unsigned address;
{
        unsigned i;
    rcb_ptr qrcb;
        unsigned char *k;

if (address >= max_terminals)
                return NULL;
        else if (rcbs[address].free == 0)
    {
        qrcb = &rcbs[address];
        qrcb->free = 1;
        qrcb->address = address;
        qrcb->state = RESET_STATE;
        qrcb->vr = 0;
        qrcb->vs = 0;
        qrcb->txq = NULL;
        qrcb->rxq = NULL;
        qrcb->rx_length = 0;
                qrcb->inact_timer = rtc_inact_timeout;
                k = (unsigned char *) &qrcb->stat;
                for (i=0;i<sizeof(term_stat);i++)
                        *k++ = 0;
        return(&rcbs[address]);
    }
    return(NULL);
}

/*
    procdure: rtc_find author: Marvin Sojka created:

called by:
        rtc_main
        rtc_in calls:
        none history:

purpose: This is routine will locate a rcb with a given address if the
```

```
                    rcb exists.  If the rcb exists, the address of the rcb is
                    returned. Otherwise NULL is returned.
*/
rcb_ptr rcb_find(address)
unsigned address;
{
        if (address >= max_terminals)
                return(NULL);
        else if (rcbs[address].free == 1)
                return(&rcbs[address]);
        else
                return(NULL);
}

/*
    procdure: rtc_free author: Marvin Sojka created:

called by:
        rtc_main
        rtc_in
        rtc_reset calls:
        none history:

purpose: This is frees a rcb for other uses.
*/
void rcb_free(xrcb)
rcb_ptr xrcb;
{
    release_buffer(xrcb->txq);
    release_buffer(xrcb->rxq);
    xrcb->free = 0;
}

/*
    procdure: rtc_init author: Marvin Sojka called by:
        main calls:
        none history:

purpose: This is routine initialize the whole of the rcb's available.
*/
void rcb_init()
{
    unsigned i;

for (i=0;i<max_terminals;i++)
        {
                if (sna)
                {
                        display_status ( i,'N' );
                        rcbs[i].display = 'N';
```

```
            }
        rcbs[i].free = 0;
        }
}
#include "buffer.h"
#include "rtc.h"
#include "rtcext.h"

extern unsigned char morse_table[];

char lcd_disp[32];

#define MORSE_PAUSE      7      /* number of milliseconds to wait */
#define SPACE_PAUSE     42      /* number of milliseconds to wait */
#define LETTER_PAUSE     7      /* number of milliseconds to wait */
define DOT_DASH_PAUSE   7      /* number of milliseconds to wait */ define DOT_PAUSE       10      /* number of interations through a loop */
define DASH_PAUSE      35      /* number of interations through a loop */

/*
    procdure: rtc_call author: Marvin Sojka called by:
        rtc_main calls:

history:

purpose: This is routine handles the execution of the FCC callsign in
             morse code.

parameter:
            calls -- pointer to the FCC Callsign
*/
unsigned rtc_call(calls)
char *calls;
{
        unsigned i,j,k,l;
        unsigned count;
        unsigned delay;

if (rtc_callsign_timer != 0)
                return;

rtc_callsign_timer = 175;
                /* check for zero length string which is error */ if (debug == 3)
        sc_printf("CALL SIGN %s\n",calls);

if (!(strlen(calls)))
                return();       /* signal error to calling routine */ save_display();
        LCD_putc(1);
        LCD_puts("SENDING FCC");
        LCD_set_cursor(16);
        LCD_puts("CALL SIGN");

ptt();
```

```
            sc_tdelay(110L);
            sign_init();
            i = 0;
            while (*calls != '\0')
            {
                    if (*calls == ' ')
                            sc_tdelay((long) SPACE_PAUSE);

else if ((*calls >= '0') && (*calls <= 'Z'))
                    {
                            l = (*calls - '0') * 5;
                               /* calculate offset into morse table */
                               /* based on five dots, dashes or spaces per char */ k = 0;

while ((k<5) && (morse_table[l] != ' '))
                            {
                                    if (morse_table[l] == '.')
                                            delay = DOT_PAUSE;
                                    else if (morse_table[l] == '-')
                                            delay = DASH_PAUSE;

for (j=0;j<delay;j++)
                                            send_sign();
                                            /* write out morse code char */ l++;k++;
                                           /* increment the counters */ sc_tdelay((long)DOT_DASH_PAUSE);
                                           /* pause between dot and or dash */

}
                    }
                    sc_tdelay((long)LETTER_PAUSE);
                    calls++;       /* increment the index to the call sign string * 
            }
            sc_tdelay(110L);
            clr_tx();
            restore_display();
            rtc_init_scc();
            return(1);      /* return a good status */

} save_display()
{
        unsigned p;

lock_console(1);
        for (p = 0; p < 32; p++)
        {
         LCD_set_cursor(p);
                  lcd_disp[p] = LCD_getc();
        }
 }
restore_display()
{
        unsigned p;

for (p = 0; p < 32; p++)
        {
         LCD_set_cursor(p);
         LCD_putc(lcd_disp[p]);
    }
        unlock_console();
}
```

```
#include <stdio.h>
#include "buffer.h"
#include "rtc.h"
#include "rtcext.h"
#include "vrtx.h"

buff_ptr get_buffer();

/*
    module:   rtc_ind.c author: Marvin Sojka history:

purpose: pass data info to host.
             rtc_reset_indication().
             rtc_data_indication().
*/

/*
    procdure: rtc_reset_indication author: Marvin Sojka called by:
        rtc_main calls:
        none history:

purpose: This is creates a RF_REBOOT buffer for use by the host.

*/
rtc_reset_indication()
{
    buff_ptr temp,i;
        /* if sna is not active and there is nothing on the txq then
                send a reset to the upper layers.
        */
        if ((sna) && (crcb->txq != NULL))
                return;
        else
        {
                temp = get_buffer();
                temp->address = crcb->address;
                temp->chain_status = OIC;
                temp->type = RF_REBOOT;
                temp->length = 1;
                temp->data[0] = crcb->type;
if (debug)
        sc_printf("RTC_OUT %d,%d\n",temp->type,temp->address);

sc_qpost(temp,rtc_out_q);
        }

}

/*
    procdure: rtc_data_indication author: Marvin Sojka called by:
```

```
            rtc_accept_data
            rtc_version_state
            rtc_test_state calls:
        none history:

purpose: This is creates a passes data buffers to the HOST.

*/
rtc_data_indication(nbuff)
buff_ptr nbuff;
{
if (debug)
        sc_printf("RTC_OUT %d,%d,%d\n",nbuff->type,nbuff->address,nbuff->length)

sc_qpost(nbuff,rtc_out_q);
}
    /*
        rtc.c
        author Marvin Sojka purpose:
                Declarations for global identies used in the RTC protocol
*/
#include "buffer.h"
#include "rtc.h"

void (*rtc_timer_routine)();
rcb rcbs[128];

mux_stat stat;
unsigned up_q[128];
unsigned up_q_count;
unsigned up_flag;
unsigned up_inactive_count;
unsigned squelch;
unsigned squelch_check;
unsigned rtc_min_slots;
unsigned rtc_max_slots;
unsigned rtc_slots;
unsigned rtc_counts;

rcb_ptr crcb;
buff_ptr buff_temp;

unsigned char *rtc_txptr;
unsigned char *rtc_rxptr;
unsigned char *rtc_rxptrl;

unsigned char rtc_tx_buffer[1024];
unsigned char rtc_rx_buffer[1024];

unsigned rtc_tx_length;
unsigned rtc_rx_length;
unsigned rtc_rx_length1;

unsigned rtc_rx_state;
unsigned rtc_tx_state;

unsigned rtc_timer;
unsigned rtc_inact_timeout;

unsigned rtc_block_delay;
unsigned rtc_gap_delay;
unsigned rtc_up_delay;
unsigned rtc_ptt_delay;
```

```
unsigned rtc_callsign_timer;
unsigned char rtc_callsign[128];

long mailbox;
unsigned command_port;
unsigned data_port;
unsigned vector;
unsigned baud;
unsigned scc_reset;
unsigned port;
comm_port comm_ports[2];

unsigned kmart;
unsigned sna;
unsigned data_packet_size;
unsigned total_size;
unsigned rtc_in_q;
unsigned rtc_out_q;
unsigned max_terminals;
unsigned max_in;

unsigned b9600;
unsigned dual_enabled;
unsigned dual_turn;

unsigned debug;
                    #include "buffer.h"
#include "rtc.h"
#include "rtcext.h"
long sc_gtime();
/*
    module:  rtc_pri.c procdure: rtc_prifsm author: Marvin Sojka created: 2/29/87 history:

purpose: handle main finite state machin for rtc protocol.
                    see RTC overveiw documentation for the primary
                    Finite state machine.
*/ long sc_gtime();
rtc_prifsm(event)
{
    unsigned retcode;

if (debug == 2)
        sc_printf("%lu R%d,%d,%d\n",sc_gtime(),crcb->address,crcb->state,event);

switch (crcb->state)
    {
        case RESET_STATE:
            retcode = rtc_reset_state(event);
            break;

case NORM_STATE:
            retcode = rtc_norm_state(event);
            break;

case RSP_STATE:
            retcode = rtc_rsp_state(event);
            break;
```

```
            case TEST_STATE:
                retcode = rtc_test_state(event);
                break;

case VERSION_STATE:
                retcode = rtc_version_state(event);
                break;
        }
    } rtc_reset_state(event)
unsigned event;
{ switch (event)
        {
            case IDLE0_EVENT:
            case IDLE1_EVENT:
            case IDLE2_EVENT:
            case IDLE3_EVENT:
            case IDLE4_EVENT:
               rtc_send_reset();
               return(NOT_DONE);
               break;

case TIMEOUT_EVENT:
                return(DONE);
                break;

case RESET_EVENT:
                rtc_reset_indication();
                crcb->state = NORM_STATE;
                crcb->vr = crcb->vs = 0;
                return(CONNECT_CODE);

case TEST_EVENT:
            case VERSION_EVENT:
            case D1_EVENT:
                release_buffer(buff_temp);

case ACK0_EVENT:
            case ACK1_EVENT:
            case ACK2_EVENT:
            case ACKN0_EVENT:
            case ACKN1_EVENT:
            case ACKN2_EVENT:
            case D0_EVENT:
            case D2_EVENT:
            case TERROR_EVENT:
                            rtc_reset(crcb);
                return(DONE);
        }
    } rtc_norm_state(event)
unsigned event;
{ switch (event)
        { case IDLE0_EVENT:
                rtc_send_poll();
                return(NOT_DONE);

case IDLE1_EVENT:
            case IDLE2_EVENT:
                crcb->vs = (crcb->vs + 1) & 0x01;
                rtc_send_data();
                crcb->state = RSP_STATE;
                return(NOT_DONE);
```

```
        case IDLE3_EVENT:
            rtc_send_test();
            crcb->state = TEST_STATE;
            return(NOT_DONE);

case IDLE4_EVENT:
            rtc_send_version();
            crcb->state = VERSION_STATE;
            return(NOT_DONE);

case TIMEOUT_EVENT:
            return(DONE);

case RESET_EVENT:
                        rtc_reset(crcb);
            return(DONE);

case TEST_EVENT:
        case VERSION_EVENT:
            release_buffer(buff_temp);
                        rtc_reset(crcb);
            return(DONE);

case ACK0_EVENT:
        case ACK1_EVENT:
            return(DONE);

case ACK2_EVENT:
                        rtc_reset(crcb);
            return(DONE);

case ACKN0_EVENT:
        case ACKN1_EVENT:
            return(DONE);

case ACKN2_EVENT:
                        rtc_reset(crcb);
            return(DONE);

case D0_EVENT:
            return(DONE);

case D1_EVENT:
            rtc_accept_data();
            crcb->vr = (crcb->vr+1) & 0x01;
            rtc_send_poll();
            return(NOT_DONE);

case D2_EVENT:
        case TERROR_EVENT:
                        rtc_reset(crcb);
            return(DONE);
    }
} rtc_rsp_state(event)
unsigned event;
{
    switch (event)
    {
        case IDLE0_EVENT:
        case IDLE1_EVENT:
        case IDLE2_EVENT:
            rtc_send_npoll();
            return(NOT_DONE);

case IDLE3_EVENT:
        case IDLE4_EVENT:
                        rtc_reset(crcb);
            return(DONE);
```

```
            case TIMEOUT_EVENT:
                return(DONE);

case RESET_EVENT:
                            rtc_reset(crcb);
                return(DONE);

case ACK0_EVENT:
                rtc_done(1);
                crcb->state = NORM_STATE;
                return(DONE);

case ACK1_EVENT:
                crcb->vs = (crcb->vs + 1) & 0x01;
                rtc_done(0);
                rtc_send_data();
                return(NOT_DONE);

case ACK2_EVENT:
                rtc_send_data();
                return(NOT_DONE);

case ACKN0_EVENT:
                rtc_done(1);
                crcb->state = NORM_STATE;
                return(DONE);

case ACKN1_EVENT:
                rtc_done(0);
                return(DONE);

case ACKN2_EVENT:
                crcb->vs = (crcb->vs + 1) & 0x01;
                return(DONE);

case TEST_EVENT:
            case VERSION_EVENT:
            case D1_EVENT:
                release_buffer(buff_temp);
            case D0_EVENT:
            case D2_EVENT:
            case TERROR_EVENT:
                            rtc_reset(crcb);
                return(DONE);

}
} rtc_test_state(event)
unsigned event;
{ switch (event)
        {
            case IDLE0_EVENT:
            case IDLE1_EVENT:
            case IDLE2_EVENT:
            case IDLE4_EVENT:
                            rtc_reset(crcb);
                return(DONE);

case IDLE3_EVENT:
                rtc_send_test();
                crcb->state = TEST_STATE;
                return(NOT_DONE);

case TIMEOUT_EVENT:
                crcb->state = NORM_STATE;
                return(DONE);

case RESET_EVENT:
                            rtc_reset(crcb);
```

```
                return(DONE);

case TEST_EVENT:
                        rtc_accept_special();
            rtc_done(0);
            crcb->state = NORM_STATE;
            return(DONE);

case D1_EVENT:
        case VERSION_EVENT:
            release_buffer(buff_temp);

case ACK0_EVENT:
        case ACK1_EVENT:
        case ACK2_EVENT:
        case ACKN0_EVENT:
        case ACKN1_EVENT:
        case ACKN2_EVENT:
        case D0_EVENT:
        case D2_EVENT:
        case TERROR_EVENT:
                        rtc_reset(crcb);
            return(DONE);
    }
} rtc_version_state(event)
unsigned event;
{ switch (event)
    {
        case IDLE0_EVENT:
        case IDLE1_EVENT:
        case IDLE2_EVENT:
        case IDLE3_EVENT:
                        rtc_reset(crcb);
            return(DONE);

case IDLE4_EVENT:

rtc_send_version();
            crcb->state = VERSION_STATE;
            return(NOT_DONE);

case TIMEOUT_EVENT:
            crcb->state = NORM_STATE;
            return(DONE);

case RESET_EVENT:
                        rtc_reset(crcb);
            return(DONE);

case VERSION_EVENT:
                        rtc_accept_special();
            rtc_done(0);
            crcb->state = NORM_STATE;
            return(DONE);

case D1_EVENT:
        case TEST_EVENT:
            release_buffer(buff_temp);

case ACK0_EVENT:
        case ACK1_EVENT:
        case ACK2_EVENT:
        case ACKN0_EVENT:
        case ACKN1_EVENT:
        case ACKN2_EVENT:
        case D0_EVENT:
```

```
                case D2_EVENT:
                case TERROR_EVENT:
                                rtc_reset(crcb);
                        return(DONE);
        }
}
#include "buffer.h"
#include "rtc.h"
#include "rtcext.h"

unsigned check_buffer();

/*
    module:   rtc_rx.c procdure: rtc_rx author: Marvin Sojka history:

purpose: this routine is used to decode the received data to
             determine which event occurred for the primary state machine DATA LINK COMMAND               OTHER CONSIDERATIONS         EVENT
                                        BAD CRC                      TIMEOUT_EVENT
        RESET                                                        RESET_EVENT
        POLL0 or POLL1                  GOOD ACK and NO DATA         ACK0_EVENT
        POLL0 or POLL1                  GOOD ACK and DATA            ACK1_EVENT
        POLL0 or POLL1                  BAD ACK                      ACK2_EVENT
        NPOLL0 or NPOLL1                GOOD ACK and NO DATA         ACKN0_EVENT
        NPOLL0 or NPOLL1                GOOD ACK and DATA            ACKN1_EVENT
        NPOLL0 or NPOLL1                BAD ACK                      ACKN2_EVENT
        DATA (see rtc_rcv_data)         Chain Error                  TERROR_EVENT
        DATA                            NO BUFFER                    D0_EVENT
        DATA                            Buffer_OverFlow              D2_EVENT
        DATA                            OK                           D1_EVENT
        TEST (see rtc_rcv_test)         NO BUFFER                    D0_EVENT
        TEST                            OK                           TEST_EVENT
        VERSION(see rtc_rcv_version)    NO BUFFER                    D0_EVENT
        VERSION                         OK                           VERSION_EVENT
*/
unsigned rtc_rx()
{ unsigned event;
ifdef LRCHASH
        if (!check_lrchash())
#else
        if (!check_crc())
#endif
        {
        event = TIMEOUT_EVENT;
                crcb->stat.crc_errors++;
                stat.crc_errors++;
        }
    else
    {
        switch (rtc_rx_buffer[2] & 0x0F)
        { case RESET:
                event = RESET_EVENT;
                                crcb->type = rtc_rx_buffer[3] & 0xFF;
                        break;

case POLL0:
```

```
        case POLL1:
                        /* if NPOLL is set then the events are ACKNX_EVENTS
                                they are ACKX_EVENT */
            if (rtc_rx_buffer[2] & NPOLL)
                event = ACKN0_EVENT;
            else
                event = ACK0_EVENT;

/*
                                if vs value is good then check if last i
                        */
            if ((rtc_rx_buffer[2] & 0x01) == crcb->vs)
            {
                if ((crcb->txq != NULL) &&
                    (!(crcb->txq->chain_status & LIC)))
                    event++;
            }
            else
                event += 2;
            break;

case DATA:
            event = rtc_rcv_data();
            break;

case TEST:
            event = rtc_rcv_test();
            break;

case VERSION:
            event = rtc_rcv_version();
            break;

default:
            event = TIMEOUT_EVENT;
            break;

}
    } return(event);

}
#include <stdio.h>
#include "buffer.h"
#include "rtc.h"
#include "rtcext.h"
#include "vrtx.h"

/*
        rtc_up --
        rtc_up handles the sending and receiving of the unnumber poll commands
        this routine will setup.
*/
void rtc_up_start();
void rtc_up_squelch();
extern void rtc_timeout();
unsigned squelch_timeout;

rtc_up()
{
        unsigned done,i,j,collisions;
        rcb_ptr crcb;

done = 0;
        /*
                loop till exit required
        */
        while (!done)
        {
```

```
                /* reset counters */
                collisions = 0;
                up_q_count = 0;

/* send UP command on RF Link */
                if (rtc_send_up(rtc_slots))
                        return;

/* Recv a answer for each slot in UP command */
                for (i=0;i<rtc_slots;i++)
                {
                        /* If collision is detected increment counter */
                        if (rtc_rcv_up(i))
                        {
                                collisions++;
                                stat.up_collisions[i]++;
                        }

}
                if (up_q_count > 0)
                {
                        rtc_slots = rtc_min_slots;
                        done = 1;
                }
                else if (collisions) /* == (rtc_slots/2 + 1)) */
                {
                        rtc_slots += rtc_counts;
                        if (rtc_slots > rtc_max_slots)
                        {
                                done = 1;
                                rtc_slots = rtc_min_slots;
                                for (i=0;i<max_terminals;i++)
                                {
                                        stat.up_max++;
                                        crcb = &rcbs[i];
                                        if ((crcb->free == 1) &&
                                                (crcb->inact_timer != 0xFFFF))
                                        {
                                                up_q[up_q_count] = crcb->address
                                                up_q_count++;
                                        }
                                }
                        }
                }
                else
                {
                        rtc_slots = rtc_min_slots;
                        done = 1;
                }
        }

} rtc_send_up(slots)
unsigned slots;
{
        unsigned i,j;
        rcb_ptr crcb;

up_inactive_count = (up_inactive_count + 1) % 10;

stat.up_count[slots]++;
        rtc_tx_buffer[0] = STX;
        rtc_tx_buffer[1] = 0xFF;
        rtc_tx_buffer[2] = UP;
        rtc_tx_buffer[3] = slots | 0x80;

j = 4;
        mailbox = 0L;
        for (i=0;i<max_terminals;i++)
```

```
                {
                        crcb = &rcbs[i];
                        if (((crcb->free == 1)  &&
                                ((crcb->state == RESET_STATE) ||
                                 (crcb->txq != NULL))) &&
                                ((crcb->inact_timer != 0xFFFF) ||
                                 (up_inactive_count == 0)))
                        {
                                rtc_tx_buffer[j] = crcb->address | 0x80;
                                j++;
                        }
                }
                rtc_tx_buffer[j++] = ETX;
#ifdef LRCHASH
                set_lrchash(j);
#else
                set_crc(j);
#endif
                rtc_txptr = &rtc_tx_buffer[0];
                squelch_timeout = 500;
                if (!check_squelch())
                {
                        rtc_timer_routine = &rtc_up_squelch;
                        rtc_timer = 1;
                }
                else
                {
                        ptt();
                        rtc_timer_routine = rtc_up_start;
                        /* RB2212 has a attack timer of 15 ms */
                        rtc_timer = rtc_ptt_delay;
                }
                /* wait for transmission of data */
                if (sc_pend(0L,&mailbox) == (void *)TIMEOUT_EVENT)
                        return(1);
                else
                        return(0);
        } rtc_rcv_up(slot)
{
        unsigned crc,i,retcode;
        unsigned *xcrc;
        unsigned char *x;

retcode = 0;
        squelch = 0;
        up_flag = 0;

mailbox = 0L;
        rtc_timer = rtc_ptt_delay-2;
        sc_pend(0L,&mailbox);

mailbox = 0L;
        squelch = 0;
        squelch_check = 1;
        rtc_rx_init();
        rtc_timer = rtc_up_delay+1;
        rtc_rxptrl = &rtc_rx_buffer[0];
        sc_pend(0L,&mailbox);
        squelch_check = 0;
        rtc_stop_scc();

if (rtc_rx_length == 6)
        {
#ifdef LRCHASH
                if (!check_lrchash())
#else
                if (!check_crc())
#endif
```

```
                        retcode = 1;
            else
            {
                    up_q[up_q_count] = rtc_rx_buffer[1] & 0x7F;
                    stat.up_responses[slot]++;
                    up_q_count++;
            }
    }
    else if (squelch==0xFFFF)
            retcode = 1;
        return(retcode);
} void rtc_up_squelch()
{
        if (!check_squelch())
        {
                squelch_timeout--;
                if (squelch_timeout)
                {
                        rtc_timer_routine = &rtc_up_squelch;
                        rtc_timer = 1;
                }
                else
                        rtc_timeout();
        }
        else
        {
                ptt();
                rtc_timer_routine = rtc_up_start;
                /* RB2212 has a attack timer of 15 ms */
                rtc_timer = rtc_ptt_delay;
        }
} void rtc_up_start()
{
        rtc_timer_routine = &rtc_timeout;
        rtc_timer = 0;
        squelch = 0;
        up_flag = 1;
        rtc_tx_init();
}
#include "buffer.h"
#include "rtc.h"
#include "rtcext.h"

extern rtc_tx_init();
void rtc_tx_start();
void rtc_tx_squelch();
extern void rtc_timeout();
unsigned address;

rtc_send_poll()
{
        if (crcb->vr)
                rtc_tx_buffer[2] = POLL1 | 0xC0;
        else
                rtc_tx_buffer[2] = POLL0 | 0xC0;
        rtc_send(4);
}
rtc_send_npoll()
{
        if (crcb->vr)
                rtc_tx_buffer[2] = POLL1 | 0xC0 | NPOLL;
        else
                rtc_tx_buffer[2] = POLL0 | 0xC0 | NPOLL;
        rtc_send(4);
} rtc_send_reset()
```

```c
{
        rtc_tx_buffer[2] = RESET | 0xC0;
        rtc_send(4);
} rtc_send_data()
{
        unsigned i,length,length1;
        unsigned char *tdata;
        unsigned char *data;
        buff_ptr temp;

temp = crcb->txq;
        rtc_tx_buffer[2] = DATA | 0xC0 | temp->chain_status;

length1 = temp->length;
        data  = &rtc_tx_buffer[3];
        tdata = &(temp->data[0]);
        for (i=0;i<temp->length;i++)
        {
                if ((*tdata == STX) ||
                    (*tdata == ETX) ||
                    (*tdata == DLE))
                {
                        *data++ = DLE;
                        *data++ = *tdata | 0x80;
                        tdata++;
                        length1++;
                }
                else
                        *data++ = *tdata++;
        }
        length1 += 4;
        rtc_send(length1);
} rtc_send_version()
{
        rtc_tx_buffer[2] = VERSION | 0xC0;
        rtc_send(4);
} rtc_send_test()
{
        unsigned i,length,length1;
        unsigned char *tdata;
        unsigned char *data;
        buff_ptr temp;

temp = crcb->txq;

rtc_tx_buffer[2] = TEST | 0xC0;

length1 = temp->length;
        data  = &rtc_tx_buffer[3];
        tdata = &(temp->data[0]);
        for (i=0;i<temp->length;i++)
        {
                if ((*tdata == STX) ||
                    (*tdata == ETX) ||
                    (*tdata == DLE))
                {
                        *data++ = DLE;
                        *data++ = *tdata | 0x80;
                        tdata++;
                        length1++;
                }
                else
                        *data++ = *tdata++;
        }
```

```
            length1 += 4;
            rtc_send(length1);
} rtc_send( length )
unsigned length;
{
        unsigned i;
        address = crcb->address;
        rtc_tx_buffer[0] = STX;
        rtc_tx_buffer[1] = crcb->address | 0x80;
        rtc_tx_buffer[length-1] = ETX;
#ifdef LRCHASH
        set_lrchash(length);
#else
        set_crc(length);
#endif
        rtc_txptr = &rtc_tx_buffer[0];
        rtc_rxptr1 = &rtc_rx_buffer[0];
        if (!check_squelch())
        {
                if (sna)
                        display_status(address,'*');
                rtc_timer_routine = &rtc_tx_squelch;
                rtc_timer = 10;
        }
        else
        {
                if (sna)
                        display_status(address,'X');
                ptt();
                rtc_timer_routine = &rtc_tx_start;
                /* RB2212 has a attack timer of 15 ms */
                rtc_timer = rtc_ptt_delay;
        }

}
void rtc_tx_squelch()
{
        if (!check_squelch())
        {
                rtc_timer_routine = &rtc_tx_squelch;
                rtc_timer = 10;
        }
        else
        {
                if (sna)
                        display_status(address,'X');
                ptt();
                rtc_timer_routine = &rtc_tx_start;
                /* RB2212 has a attack timer of 15 ms */
                rtc_timer = rtc_ptt_delay;
        }
}
void rtc_tx_start()
{
        rtc_timer_routine = &rtc_timeout;
        rtc_timer = 0;
        squelch = 0;
        up_flag = 0;
        rtc_tx_init();
} rtc_rx_done()
{
        rtc_timer = 0;
        sc_post((long) 0xFFFF,&mailbox);
}
#include "buffer.h"
#include "rtc.h"
#include "rtcext.h"
```

```
/*
    module:   rtc_main.c procdure: rtc_main author:   Marvin Sojka history:

purpose:  main loop for rtc primary protocol.  The sequence is simple.
              rtc_main first calls rtc_in to process any data on the RTC_IN_Q.
              rtc_main will then call rtc_up to send a unnumbered poll.
              The responding devices are in up_q and the count is in
              up_q_count.  Each entry in up_q is then polled until nothing is
              left to communicate to it for.  It the terminal has just been
              reseted or connected then a corresponding indication is sent to
              the higher layers.
*/ rcb_ptr rcb_find(unsigned);
rcb_ptr rcb_alloc(unsigned);

rtc_main()
{
    unsigned event,i,j;
        unsigned timeout_count;
        unsigned char display;

for (;;)
    {
                rtc_switch();

/* check for messages from the above layers */
        rtc_in();

/* check for inactivity */
        rtc_check_inact();

rtc_call(&rtc_callsign[0]);

/* send a unnumbered poll and see if any devices are out there */
        rtc_up();

/* check each member of the up_q for activity */ for (j=0;j<up_q_count;j++)
        {
            /* make sure the device is defined */
            if ((crcb = rcb_find(up_q[j])) ||
                (crcb = rcb_alloc(up_q[j])))
            {
                crcb->inact_timer = rtc_inact_timeout;
                /* get idle state event */
                event = rtc_idle();
                            timeout_count = 0;

mailbox = 0L;
                /* run event thru state machine */
                while ((i = rtc_prifsm(event))== NOT_DONE)
                {
                                /* wait for send to complete */
                                event = sc_pend(0L,&mailbox);

mailbox = 0L;
                                rtc_timer = rtc_ptt_delay-5;
                                sc_pend(0L,&mailbox);

/* wait for receive value */
                                mailbox = 0L;
                                rtc_rx_init();
```

```
                    event = sc_pend(0L,&mailbox);
                    mailbox = 0L;
                                        if (sna)
                                            display_status(crcb->address,'D'

/* if timeout leave as is else check receive buffer */
        if (event != TIMEOUT_EVENT)
                            {
                                        display = 'A';
                    event = rtc_rx();
                            }
                            else
                            {
                                        display = 'T';
                                        crcb->stat.timeouts++;
                                        stat.timeouts++;
                            } if (event != TIMEOUT_EVENT)
                                .  timeout_count = 0;
                        else
                        {
                                        if (display == 'A')
                                                display = 'E';

if (timeout_count < 3)
                                                event = rtc_idle();
                                        else
                                                event = TIMEOUT_EVENT;
                                        timeout_count++;
                        }
                }
                if (crcb->txq)
                            display = 'M';
                if (sna)
                            display_status(crcb->address,display);

}
        }
    }
}
```

I claim as my invention:

1. A method of effecting communication between a primary processor means and a group of secondary processor means having respective distinctive identification means, with communication link means for affording communication therebetween, said method comprising:
   (a) operating said primary processor means to transmit a polling message via said communication link means,
   (b) operating the secondary processor means which receive said polling message and which have reason to respond thereto,
      (b1) to select from a series of response time slots less than the number of secondary processor means, and
      (b2) in the respective selected time slots, to send respective response messages which contain the respective identification means such that the primary processor means may identify respective secondary processor means of the group which have responded to the polling message, and
   (c) operating the primary processor means to time the expiration of the series of response time slots defining a response time interval and after expiration of such response time interval, to initiate communication via said communication link means with a particular one of said secondary processor means which has responded to said polling messages.

2. The method of claim 1, further comprising operating said primary processor means to determine the number of secondary processor means which may respond at the time of a polling message, and when the number of said series of time slots is more or less than needed, sending a time slot number change message to said secondary processor means changing the number of said series of response time slots.

3. The method of claim 2, further comprising operating said primary processor means subsequent to the issuance of a further polling message to observe a different response time interval corresponding to the expiration of the changed number of response time slots before initiating further communications via said communication link means.

4. The method of claim 1, further comprising operating said primary processor means to automatically evaluate whether a greater or lessor number of response time slots is indicated, and as indicated sending concurrently with a subsequent one of the polling messages a time slot number change message for changing the number of said series of response time slots.

5. The method of claim 1, further comprising operating said primary processor means when the primary processor means has a message to send to a particular secondary processing means to send a polling message and contemporaneously therewith to send an identifying message containing the identification means for identifying the particular secondary processing means.

6. The method of claim 5, further comprising operating the particular secondary processing means upon receipt of the polling message and identifying message to execute a timing cycle defining the series of response time slots, to randomly select one of the response time slots, and in the randomly selected time slots sending an acknowledgement message containing its identification means.

7. The method of claim 6 wherein the polling message including the identifying message occupies a time interval not greater than the duration of a response time slot.

8. The method of claim 6 wherein a response time slot has a duration of not greater than about forty milliseconds.

9. The method of claim 8 wherein the secondary processor means and the primary processor means communicate with each other via a single channel radio frequency link.

10. The method of claim 1 wherein the primary processor means is selectively operated to reserve a specific response time slot and to transmit one of the polling messages which concurrently designates a particular secondary processing means which is to use the reserved specific response time slot.

* * * * *

UNITED STATES PATENT AND TRADEMARK OFFICE
CERTIFICATE OF CORRECTION

PATENT NO. : 4,924,462

DATED : May 8, 1990

INVENTOR(S) : MARVIN L. SOJKA

It is certified that error appears in the above-identified patent and that said Letters Patent is hereby corrected as shown below:

Column 1, after the title, the following should appear:

AUTHORIZATION PURSUANT TO THE COMMISSIONER'S NOTICE OF MARCH 20, 1987 (1077 OG 22)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Columns 13 and 14, above "RTC PROTOCOL SPEC DECEMBER 14, 1988", the following should appear:

© 1988 Norand Corporation

Signed and Sealed this

Fifth Day of May, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 4,924,462
DATED : May 8, 1990
INVENTOR(S) : Marvin L. Sojka

It is certified that error appears in the above-identified patent and that said Letters Patent is hereby corrected as shown below:

Columns 11 and 12, above "3.0 RTC program interface" insert

--RTC PROTOCOL SPEC December 14, 1988--

Columns 11 and 12, above "RTC PROTOCOL SPEC December 14, 1988" insert

--©1988 Norand Corporation--

Columns 165 and 166, above "I claim as my invention," insert

--©1988 Norand Corporation--

Signed and Sealed this

Fifteenth Day of September, 1992

Attest:

DOUGLAS B. COMER

*Attesting Officer*　　*Acting Commissioner of Patents and Trademarks*